United States Patent
Okamoto et al.

(10) Patent No.: US 7,776,224 B2
(45) Date of Patent: Aug. 17, 2010

(54) APPARATUS FOR TREATING BALLAST WATER AND METHOD FOR TREATING BALLAST WATER

(75) Inventors: Yukihiko Okamoto, Kawasaki (JP); Shigeki Fujiwara, Kawasaki (JP); Koji Fuchigami, Kawasaki (JP); Keisuke Nakahara, Kawasaki (JP); Masakuni Inoko, Tokyo (JP); Sho Ishida, Yokohama (JP)

(73) Assignee: JFE Engineering Corporation, Tokyo (JP)

( * ) Notice: Subject to any disclaimer, the term of this patent is extended or adjusted under 35 U.S.C. 154(b) by 96 days.

(21) Appl. No.: 11/920,728

(22) PCT Filed: Jun. 2, 2006

(86) PCT No.: PCT/JP2006/311118

§ 371 (c)(1),
(2), (4) Date: Nov. 20, 2007

(87) PCT Pub. No.: WO2006/132157

PCT Pub. Date: Dec. 14, 2006

(65) Prior Publication Data

US 2009/0127207 A1    May 21, 2009

(30) Foreign Application Priority Data

Jun. 10, 2005 (JP) .............................. 2005-171697
Oct. 14, 2005 (JP) .............................. 2005-300357
Nov. 7, 2005 (JP) .............................. 2005-322025
Dec. 7, 2005 (JP) .............................. 2005-352860
Feb. 20, 2006 (JP) .............................. 2006-041919

(51) Int. Cl.
C02F 1/76 (2006.01)
C02F 1/70 (2006.01)
C02F 9/02 (2006.01)
C02F 9/04 (2006.01)
C02F 9/08 (2006.01)

(52) U.S. Cl. ............. 210/756; 210/757; 210/764; 210/199; 210/202; 210/205; 210/242.1; 210/257.1; 366/173.2; 366/340

(58) Field of Classification Search ............... 210/743, 210/745, 746, 749, 752, 753, 756, 757, 759, 210/760, 764, 172.1, 172.2, 172.3, 172.6, 210/198.1, 199, 200, 201, 202, 205, 241, 210/242.1, 252, 253, 257.1, 258, 259, 260, 210/931; 114/125; 422/30; 138/44; 137/115.11; 366/173.1, 173.2, 174.1, 175.2, 336, 340
See application file for complete search history.

(56) References Cited

U.S. PATENT DOCUMENTS 3,937,662 A * 2/1976 Bartik .................. 210/745

(Continued)

FOREIGN PATENT DOCUMENTS

JP    4-322788    11/1992

(Continued)

OTHER PUBLICATIONS

International Search Report for PCT/JP2006/311118 mailed Sep. 12, 2006.

(Continued)

*Primary Examiner*—Matthew O Savage
*Assistant Examiner*—Lucas Stelling
(74) *Attorney, Agent, or Firm*—Nixon & Vanderhye P.C.

(57) ABSTRACT

The present invention relates to an apparatus for treating ballast water, the apparatus being capable of treating ballast water so as to meet the ballast water standard established by the IMO exactly at low costs. The treatment apparatus of the present invention comprises a filter (4) that filters sea water to trap aquatic organisms, a bactericide supply apparatus (5) that supplies bactericide to the filtrate sea water, and a venturi tube 7 that introduces the sea water to which the bactericide is added, to produce cavitation in the sea water, thereby diffusing the bactericide and also damaging and destroying aquatic organisms in the sea water.

8 Claims, 8 Drawing Sheets

U.S. PATENT DOCUMENTS

| | | | | |
|---|---|---|---|---|
| 4,123,800 | A | * | 10/1978 | Mazzei ..................... 366/163.2 |
| 5,893,641 | A | * | 4/1999 | Garcia ........................ 137/888 |
| 6,193,893 | B1 | * | 2/2001 | Mazzei et al. ............. 366/163.2 |
| 6,200,486 | B1 | * | 3/2001 | Chahine et al. ............. 210/764 |
| 6,270,680 | B1 | * | 8/2001 | Silveri et al. ................ 205/743 |
| 2003/0015481 | A1 | * | 1/2003 | Eidem ........................ 210/760 |
| 2003/0029811 | A1 | * | 2/2003 | Russell ....................... 210/749 |
| 2004/0129645 | A1 | * | 7/2004 | Perlich et al. ............... 210/758 |

FOREIGN PATENT DOCUMENTS

| | | |
|---|---|---|
| JP | 5-910 | 1/1993 |
| JP | 10-113670 | 5/1998 |
| JP | 2003-181443 | 7/2003 |
| JP | 2004-188240 | 7/2004 |
| JP | 2004-534630 | 11/2004 |
| KR | 2003-0069175 | 8/2003 |
| WO | WO 02/44089 | 6/2002 |
| WO | 2004/014804 | 2/2004 |

OTHER PUBLICATIONS

Dang, Kun et al., Economy Analysis of Various Methods of Processing Ballast Water at Sea, Shijie Haiyun, vol. 26, No. 3, Jun. 2003, pp. 44-47.

* cited by examiner

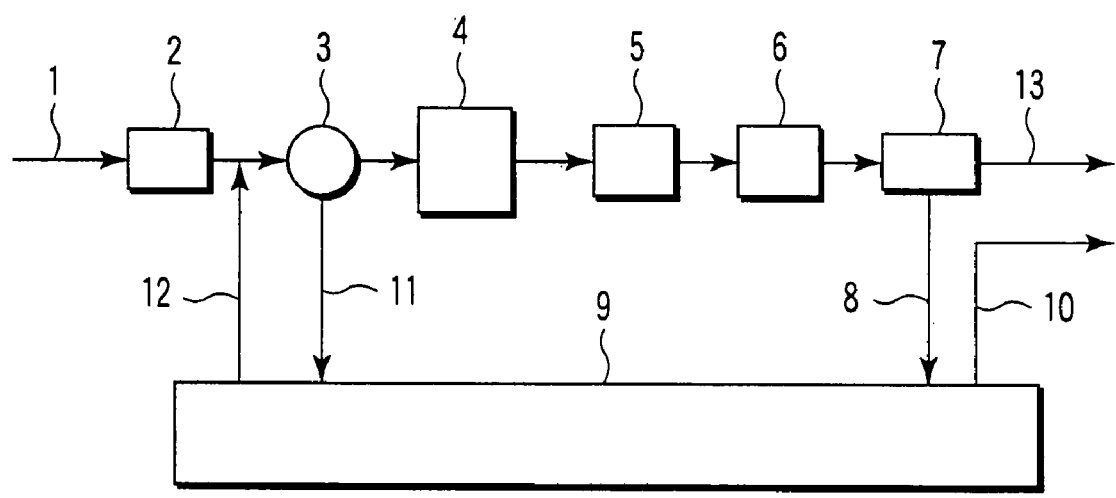
F I G. 1

APPARATUS FOR TREATING BALLAST WATER AND METHOD FOR TREATING BALLAST WATER

This application is the U.S. national phase of International Application No. PCT/JP2006/311118, filed 2 Jun. 2006, which designated the U.S. and claims priority to Japanese Patent Application Nos. 2005-171697, filed 10 Jun. 2005, 2005-300357, filed 14 Oct. 2005, 2005-322025, filed 7 Nov. 2005, 2005-352860, filed 7 Dec. 2005, and 2006-041919, filed 20 Feb. 2006, the entire contents of each of which are hereby incorporated by reference.

TECHNICAL FIELD

The present invention relates to an apparatus and a method for treating ballast water to be taken into a ballast tank of marine vessels, and, particularly, to an apparatus and a method for destroying harmful bacteria and plankton contained in ballast water efficiently.

BACKGROUND ART

Generally, in marine vessels having little or no cargo, ballast water is introduced into a ballast tank before the departure of these marine vessels from the necessity of securing the submerged depth of a propeller and ensuring safe navigation on voyage with no cargo. When cargo is loaded in the harbor on the contrary, ballast water is discharged. In the meantime, if ballast water is taken on by and discharged from a marine vessel which plies between a loading port and an unloading port differing in environment, a difference in the type of bacteria and microorganisms such as plankton contained in ballast water arouses a fear as to an undesirable influence on the coastal ecosystem. For this reason, in the international conference held in February, 2004 with reference to the control of ballast water in marine vessels, an international treaty on the limit and control of ballast water and deposits from marine vessels was eventually adopted and imposed an obligation to treat ballast water.

According to the standard established by the International Maritime Organization (IMO) as the standard for treating ballast water, the number of microorganisms (mainly, zooplankton) 50 µm or larger in size which are contained in ballast water discharged from a marine vessel is less than 10 in 1 m$^3$, the number of microorganisms (mainly phytoplankton) 10 µm or more and less than 50 µm in size is less than 10 in 1 mL, the number of Vibrio cholerae is less than 1 cfu in 100 mL, the number of colibacilli is less than 250 cfu in 100 mL and the number of enterococci is less than 100 cfu in 100 mL.

Technologies used to treat ballast water are still in progress in many institutions concerned. In prior technologies, for example, Jpn. Pat. Appln. KOKAI Publication No. 2003-181443 discloses an apparatus used to sterilize ballast water by utilizing high-temperature exhaust gas emitted from the main engine of a marine vessel. Also, Jpn. Pat. Appln. KOKAI Publication Nos. 4-322788 and 5-000910 disclose a method of sterilizing harmful plankton or cysts of harmful algae contained in ballast water by using a chlorine-based bactericide or hydrogen peroxide when the ballast water is discharged. Particularly, Jpn. Pat. Appln. KOKAI Publication No. 4-322788 discloses a process in which air is blown into ballast water by an aerating apparatus when the ballast water is discharged to make harmless chlorine (residual chlorine) left after cysts of harmful algae are destroyed.

However, the number of organisms contained in sea water to be used as ballast largely differs depending on the date and time when and place where the sea water is sampled and widely varies between about a few organisms and about hundreds of millions of organisms in 1 mL of sea water. The method disclosed in Jpn. Pat. Appln. KOKAI Publication No. 2003-181443 has a difficulty in exactly achieving all requirements of the standard established by the International Maritime Organization (IMO). Also, the methods described in Jpn. Pat. Appln. KOKAI Publication Nos. 4-322788 and 5-000910 have the problems that these methods have no effect on relatively large zooplankton and microorganisms resistant to bactericides and that the influence of remaining bactericide on the environment when the bactericide is discharged together with the ballast water cannot be neglected.

Even if a chlorine-based bactericide is added to ballast water to destroy cysts of harmful algae in the method of adding a chlorine-based bactericide among the methods described in Jpn. Pat. Appln. KOKAI Publication No. 4-322788, residual chlorine afterwards reacts with organic materials in ballast water to generate toxic trihalomethanes. However, in this publication, nothing is considered about this trihalomethanes. Even if air is blown into ballast water by using an aeration apparatus, only a part of these trihalomethanes transfer to a vapor phase but a large part are left unremoved in a liquid phase and are not made harmless. Then, ballast water including these trihalomethanes is discharged and exerts unfavorable influences on the environment. On the other hand, the method in which hydrogen peroxide is added among the methods described in this publication has the problem that it is difficult to destroy bacteria in ballast water by hydrogen peroxide to the extent that the standard of ballast water treatment of the IMO is satisfied.

DISCLOSURE OF INVENTION

The present invention was made in view of this situation. It is an object of the present invention to provide an apparatus and method for treating ballast water to exactly destroy plankton and bacteria contained in ballast water taken on by a marine vessel and to prevent harmful substances from being discharged.

The inventors of the present invention have made earnest studies to develop a treatment method that suppresses the generation of trihalomethanes and exerts no unfavorable influence on the environment in the case of removing plankton and bacteria by using a chlorine-based bactericide, to complete the present invention. An apparatus and a method for treating ballast water according to the present invention have the following structures.

(1) An apparatus for treating ballast water of the invention comprises: a filter that filters sea water to trap aquatic organisms; a bactericide supply apparatus that supplies bactericide to the filtrate sea water; and a venturi tube that introduces the sea water to which the bactericide is added, to produce cavitation in the sea water.

Because the apparatus of the present invention has such a structure, plankton and bacteria in sea water are destroyed (or removed) to prepare marine vessel ballast water excluding harmful organisms. The main function of each structural element is as follows and the function of each structural element is developed organically to raise the effect of removing aquatic organisms in sea water. In the filter, relatively large aquatic organisms such as zooplankton in sea water are trapped and removed. Bacteria in the sea water are destroyed by the bactericide supplied by the bactericide supply apparatus. The sea water to which the bactericide is added is made to generate cavitation by using venturi tube to damage and destroy relatively small aquatic organisms such as phytoplankton. In addition, the bactericide is rapidly dispersed in the sea water by the cavitation to thereby promote the bactericidal action of the bactericide against bacteria.

Since the diffusing action of the cavitation promotes the mixing of the bactericide in the sea water, the amount of the bactericide to be supplied can be further reduced than in the case of simply injecting the bactericide. As a result, an influence on the environment is reduced and the supply of a decomposer to make the bactericide harmless can be made unnecessary or can be reduced.

Also, as the bactericide to be supplied, sodium hypochlorite, chlorine, chlorine dioxide, hydrogen peroxide, ozone and acetyl hydroperoxide or a mixture of two or more of these compounds can be used. If the bactericide is supplied to the throat part of the venturi tube, the bactericide is automatically sucked and a pump supplying the bactericide can be omitted.

(2) The above apparatus for treating ballast water preferably further comprises a bactericide-decomposer supply apparatus that supplies bactericide-decomposer to sea water to which the bactericide is added. The provision of such a decomposer supply apparatus enables the decomposition of the bactericide remaining in the sea water to thereby minimize the influence on the area of sea to which ballast water is discharged.

Also, as the bactericide-decomposer to be supplied to chlorine bactericide such as sodium hypochlorite and chlorine, sodium thiosulfate, sodium sulfite and sodium bisulfite (sodium hydrogen sulfite) can be used. As the bactericide-decomposer to be supplied to hydrogen peroxide, sodium thiosulfate, sodium sulfite, sodium bisulfite (sodium hydrogen sulfite) and enzymes such as catalase may be used.

(3) As a modified embodiment of the above configuration, an apparatus for treating ballast water of the invention comprises: a filter that filters sea water to trap aquatic organisms; a bactericide supply apparatus that supplies bactericide to the filtrate sea water; a venturi tube that introduces the sea water to which the bactericide has been added to produce cavitation in the sea water; a water intake apparatus that takes in sea water from the sea and feeds the sea water to a ballast tank through the filter, the bactericide supply apparatus and the venturi tube; a bactericide-decomposer supply apparatus that supplies bactericide-decomposer to the sea water withdrawn from the ballast tank; a diffuser that introduces the sea water to which the bactericide-decomposer is added, to diffuse the bactericide-decomposer in the sea water; and a water discharger that withdraws the sea water from the ballast tank to discharge the sea water into the sea through the bactericide-decomposer supply apparatus and the diffuser.

The provision of such a structure ensures that when sea water is fed to the ballast tank from the sea, relatively large aquatic organisms such as zooplankton in sea water is trapped by the filter to remove them and bacteria and relatively small plankton are destroyed by the bactericide and the cavitation produced by the venturi tube, whereby the sea water treated to destroy organisms can be kept in the ballast tank. Moreover, when sea water is discharged into the sea from the ballast tank, the bactericide left unremoved in the sea water is decomposed by the bactericide-decomposer to remove the influence of the bactericide on the sea area.

The use of the diffuser that diffuses the bactericide-decomposer in sea water ensures that sea water can be made harmless exactly while discharging the sea water to the sea from the ballast tank because the bactericide-decomposer is diffused in the sea water in a short time to decompose the bactericide in a short time. Also, if the venturi tube used to feed the sea water to the ballast tank is used as the diffuser, this is useful because the apparatus can be doubled. Other stirring and mixing apparatuses may be used. Also, if the concentration of the bactericide in the sea water to be kept in the ballast tank is kept appropriately, regrowth of bacteria and plankton can be suppressed.

(4) As a modified embodiment of the above configuration, an apparatus for treating ballast water of the invention comprises: a filter that filters sea water to trap aquatic organisms; a hydrogen peroxide supply apparatus that supplies hydrogen peroxide to the filtrate sea water; a venturi tube that introduces the sea water to which the hydrogen peroxide is added, to produce cavitation in the sea water; a water intake apparatus that takes in sea water from the sea and feeds the sea water to a ballast tank through the filter, the hydrogen peroxide supply apparatus and the venturi tube; a hydrogen peroxide-decomposer supply apparatus that supplies hydrogen peroxide-decomposer to the sea water withdrawn from the ballast tank; a diffuser that introduces the sea water to which the hydrogen peroxide-decomposer is added, to diffuse the hydrogen peroxide-decomposer in the sea water; and a water discharger that withdraws the sea water from the ballast tank to discharge the sea water into the sea through the hydrogen peroxide-decomposer supply apparatus and the diffuser.

If such a structure is provided, relatively large aquatic organisms such as zooplankton in sea water is trapped by the filter to remove them when the sea water is fed to the ballast tank from the sea, and bacteria and relatively small plankton are destroyed by the hydrogen peroxide and the cavitation produced by the venturi tube, whereby the sea water treated to destroy organisms can be kept in the ballast tank. Moreover, when sea water is discharged to the sea from the ballast tank, hydrogen peroxide left unremoved in sea water is decomposed by the bactericide-decomposer to remove the influence of hydrogen peroxide on the sea area. In addition, harmful byproducts are not produced since hydrogen peroxide is used as the bactericide.

Also, the use of the diffuser that diffuses the hydrogen peroxide-decomposer in sea water ensures that the sea water can be made harmless exactly while discharging the sea water to the sea from the ballast tank because the hydrogen peroxide-decomposer is diffused in sea water in a short time to decompose hydrogen peroxide in a short time. Also, if the venturi tube used to feed sea water to the ballast tank is used as the diffuser, this is useful because the apparatus can be doubled. Other stirring and mixing apparatus may be used.

Also, if the concentration of hydrogen peroxide in sea water to be kept in the ballast tank is kept appropriately, regrowth of bacteria and plankton can be suppressed. Also, as the hydrogen peroxide-decomposer to be supplied, reducing agents that reduce and decompose hydrogen peroxide, such as sodium sulfite, sodium bisulfite (sodium hydrogen sulfite) and sodium thiosulfate can be used.

(5) In the apparatus for treating ballast water according to the above (1) to (4), the sieve opening of the filter is designed to be preferably in the range of 10 to 200 μm.

The filter is provided only to remove plankton existing in sea water. The reason why the sieve opening is designed to be 10 to 200 μm is that it is intended to reduce the frequency of backwashing while keeping the rate of trapping of zooplankton and phytoplankton at a certain level to thereby shorten the time required for treating ballast water at a port of call. In other words, if the sieve opening is larger than 200 μm, the rate of trapping of zooplankton and phytoplankton is significantly decreased, whereas if the sieve opening is smaller than 10 μm, the filter is clogged in a short time, the frequency of backwashing is increased and therefore, the time required to treat ballast water at the port of call becomes longer, showing that both of these cases are undesirable. It is particularly preferable to use a filter having a sieve opening of about 20 to 35 μm because the trapping rate and the frequency of backwashing can be set optimally.

Aquatic organisms can be efficiently trapped and removed by using, as the filter, any one of a notch wire filter, wedge wire filter and a laminate disk type filter. Also, as other filters, any of a closed type sand filter, cloth filter and metal fiber filter may be used.

(6) Preferably, the apparatus for treating ballast water according to any one of (1) to (3) further comprises a bactericide supply amount-control device that measures a pressure difference in the filter to control the amount of the bactericide to be supplied from the bactericide supply apparatus based on the measured value.

(7) Preferably, the apparatus for treating ballast water according to any one of (1) to (3) further comprises: a water quality measuring device that measures the turbidity or absorbance of the sea water to be introduced into the filter or the sea water filtered by the filter; and a bactericide supply amount-control device that controls the amount of the bactericide to be supplied from the bactericide supply apparatus based on the turbidity or absorbance measured by the water quality measuring device.

(8) When sodium hypochlorite is used as the bactericide, preferably, the apparatus for treating ballast water according to any one of (1) to (3) further comprises: a redox potential measuring device that measures the redox potential of the sea water to which the bactericide is added; and a bactericide supply amount-control device that controls the amount of the bactericide to be supplied from the bactericide supply apparatus based on the redox potential measured by the redox potential measuring device.

(9) When sodium hypochlorite is used as the bactericide, preferably, the apparatus for treating ballast water according to any one of (1) to (3) further comprises an apparatus that produces sodium hypochlorite by electrolysis of sea water.

(10) As another modified embodiment of the above configuration, an apparatus for treating ballast water of the invention comprises: a filter that filters sea water to trap aquatic organisms; a venturi tube that introduces the filtrate sea water to produce cavitation in the sea water; and a ultraviolet radiation sterilizing apparatus that destroys bacteria in the sea water.

(11) As another modified embodiment of the above configuration, an apparatus for treating ballast water of the invention comprises: a chlorine bactericide supply apparatus that supplies chlorine bactericide to sea water; a holding tank that retains the sea water to which the chlorine bactericide is added, for a prescribed time; a hydrogen peroxide supply apparatus that supplies hydrogen peroxide to the sea water retained in the holding tank for the prescribed time; and a water feed apparatus that feeds the sea water to which hydrogen peroxide is added, to a ballast tank.

Bacteria and plankton can be destroyed by supplying chlorine bactericide to sea water. However, the chlorine bactericide left unremoved after bacteria is destroyed reacts with organic substances contained in the sea water to produce trihalomethanes. FIG. 4 is a graph showing a variation in the concentration of trihalomethanes in sea water after a chlorine bactericide is injected, wherein the ordinate is the concentration of trihalomethanes (mg/L) and the abscissa is the elapsed time (min). In FIG. 4, the results of trihalomethane concentration are shown in four cases where a chlorine bactericide is injected such that the concentrations by weight of available chlorine are 5 mg/L, 10 mg/L, 50 mg/L and 100 mg/L respectively. As is clear from FIG. 4, there is almost no difference in the amount of trihalomethanes to be produced even if the amount of the chlorine bactericide to be supplied is different.

As shown in FIG. 4, the generation of trihalomethanes is continued until residual chlorine is not present and the concentration of the trihalomethanes is increased with time. In the example shown in FIG. 4, the amount of trihalomethanes to be produced one minute after the chlorine bactericide is added is about 1/10 or less of the total amount of trihalomethanes. It is found from the above result that if a chlorine-reducing agent is supplied immediately after bacteria is destroyed by supplying chlorine bactericide, to make residual chlorine lose its effect, the generation of trihalomethanes can be suppressed.

On the other hand, bacteria and plankton having a size less than 50 μm can be destroyed in a short time by a chlorine bactericide. However, in order to destroy plankton 50 μm or larger in size, it is necessary to leave available chlorine in sea water for a certain period of time. However, if available chlorine is left unremoved in sea water for a long time to destroy the plankton 50 μm or larger in size, trihalomethanes eventually increase.

Given with this situation, in the apparatus according to the above (11), the following process is adopted to properly secure the time during which available chlorine is brought into contact with sea water and to suppress the amount of trihalomethanes produced due to residual chlorine left unremoved for a long time in order to destroy bacteria and plankton by the chlorine bactericide. Specifically, after the chlorine bactericide is supplied to sea water, it is introduced into a holding tank and held in the holding tank only for the time required for the treatment of bacteria by available chlorine to carry out sterilization treatment. Next, hydrogen peroxide is supplied to the sea water discharged from the holding tank to reduce residual chlorine, thereby making the residual chlorine lose its effect to thereby suppress the generation of trihalomethanes, and at the same time, plankton 50 μm or larger in size which is imperfectly destroyed only by the treatment using a chlorine bactericide but remains alive is destroyed by hydrogen peroxide. The sea water in which bacteria and also plankton have been destroyed in the above manner is fed to the ballast tank.

As mentioned above, in the apparatus according to the above (11), sea water is brought into contact with available chlorine for a short time and then hydrogen peroxide is supplied to the sea water to reduce residual chlorine, thereby making the residual chlorine lose its effect, to suppress the generation of trihalomethanes. When hydrogen peroxide is added to residual free chlorine, the free chlorine is reduced according to the following equations.

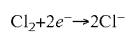

$$Cl_2 + 2e^- \rightarrow 2Cl^-$$

$$H_2O_2 \rightarrow 2H^+ + O_2 + 2e^-$$

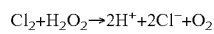

$$Cl_2 + H_2O_2 \rightarrow 2H^+ + 2Cl^- + O_2$$

As is clear from these equations, hydrogen peroxide contained in an amount by weight 0.5 times the concentration by weight of residual free chlorine reacts with the residual free chlorine to thereby reduce the residual free chlorine, thereby making the residual free chlorine lose its effect to suppress the generation of trihalomethanes.

Moreover, residual plankton 50 μm or larger in size is destroyed by hydrogen peroxide. The sterilization effect of hydrogen peroxide on bacteria is milder than that of a chlorine bactericide. Therefore, bacteria is destroyed in a short time by a chlorine bactericide and then, residual plankton 50 μm or larger in size which remains undestroyed by the treatment using only the chlorine bactericide is destroyed by hydrogen peroxide. Such a complex treatment is adopted in which the treatment using hydrogen peroxide is performed after the treatment using a chlorine bactericide, to thereby destroy bacteria and plankton, making it possible to meet the IMO standard of treatment of ballast water and at the same time, the generation of trihalomentanes is suppressed. Moreover, the treated sea water is fed to the ballast tank and kept in the ballast tank in such a manner that hydrogen peroxide is left in ballast water, whereby ballast water can be kept so as to meet the IMO standard of treatment of ballast water.

Here, the term "hold" means that bacteria and the chlorine bactericide in sea water are put into a contact state from when the chlorine bactericide is supplied to the sea water until hydrogen peroxide is supplied regardless of the flow condition of sea water. Namely, the term "hold" involves maintaining the state where sea water is kept in a vessel and absolutely stops flowing and the state where sea water is allowed to flow at a fixed flow rate in a pipe. Therefore, the term "holding tank" here includes a wide range of reserving units typified by not only a reservoir that keeps sea water but also a holding pipe in which sea water is allowed to flow at a fixed rate. As the chlorine bactericide, sodium hypochlorite, calcium hypochlorite or chlorine gas is used. When any of these compounds is used, available chlorine is present in the form of a hypochlorous acid or hypochlorous acid ion in sea water. Also, as the hydrogen peroxide, aqueous hydrogen peroxide is used.

(12) The apparatus according to the above (11) preferably comprises a hydrogen peroxide-decomposer supply apparatus that supplies hydrogen peroxide-decomposer to sea water to which hydrogen peroxide has been supplied.

Hydrogen peroxide left unremoved in sea water to which hydrogen peroxide has been supplied is decomposed by supplying hydrogen peroxide-decomposer to prevent the sea water from exerting some influences on the ocean even if the sea water is discharged to the ocean. As the hydrogen peroxide-decomposer, reducing agents or enzymes which reduce and decompose hydrogen peroxide, for example, sodium sulfite, sodium bisulfite (sodium hydrogen sulfite), sodium thiosulfate and enzymes such as catalase may be used.

(13) Preferably, in the apparatus according to the above (11), the holding time for water taken into the holding tank from when the chlorine bactericide is supplied until hydrogen peroxide is supplied is so designed that it can be set in the range of 0.05 to 10 minutes.

It is necessary that the holding time in the holding tank be sufficient to destroy bacteria and be within the time during which the generation of trihalomethanes can be prevented. As shown in FIG. 4, if the time elapsed after the chlorine bactericide is supplied is designed to be 10 minutes or less, that is, the holding time is set be 10 minutes or less, the concentration of trihalomethanes can be limited to 0.1 mg/L or less which is the standard of drinking water in Japan. Therefore, the holding time is preferably designed to be 10 minutes or less from the viewpoint of suppressing the generation of trihalomethanes.

On the other hand, it is necessary to keep sea water in the holding tank until bacteria is destroyed from the viewpoint of destroying bacteria. Given with this situation, the holding time required to destroy bacteria was investigated. With regard to the number of bacteria left unremoved, it is necessary that the number of Vibrio cholerae be less than 1 cfu in 100 mL, the number of colibacilli be less than 250 cfu in 100 mL and the number of enterococci be less than 100 cfu in 100 mL according to the IMO standard for treating ballast water. Given with this situation, the relation between the contact time of bacteria with residual available chlorine in sea water and the concentration of residual chlorine in sea water, which relation is required to meet this standard was found. In this case, it has been confirmed that other bacteria, Vibrio cholerae and enterococci are destroyed in such a condition that colibacilli are destroyed because the number of Vibrio cholerae and the number of enterococci existing in sea water are respectively significantly smaller than the number of colibacilli in sea water. For this reason, the following discussion is made using colibacilli as a subject and bacteria indicate colibacilli.

FIG. 5 shows the relation between the contact time of bacteria in sea water with residual available chlorine and the concentration of residual chlorine in sea water, in a both-axis logarithmic graph, wherein the ordinate is the concentration of residual chlorine (mg/L) and the abscissa is the contact time (minute). The target ratio of residual bacteria differs depending on the number of bacteria in sea water to be treated. FIG. 5 shows the relation between the contact time and the concentration of residual chlorine in the case where the ratio of residual bacteria is $10^{-5}$ and $10^{-3}$. In the case of sea water to be treated which contains a large number of bacteria, the target ratio of residual bacteria is decreased.

As shown in the graph of FIG. 5, the contact time can be shortened if the concentration of residual chlorine is made high in any ratio of residual bacteria. The results obtained in this experiment shows that in the case where the target ratio of residual bacteria is $10^{-3}$, 0.05 min. is enough for the contact time if the concentration of residual chlorine is 20 mg/L. If the contact time is 10 min., on the other hand, a necessary concentration of residual chlorine is 0.1 mg/L. In the case where the target ratio of residual bacteria is $10^{-5}$, 0.05 min. is enough for the contact time if the concentration of residual chlorine is 100 mg/L. If the contact time is 10 min., on the other hand, a necessary concentration of residual chlorine is 0.4 mg/L.

From the results shown in the graph of FIG. 5, it has been clarified that the holding time in the holding tank, that is, the contact time between bacteria and residual available chlorine can be set to a significantly short time if the concentration of residual chlorine is increased. However, 0.05 min. is preferably the lower limit which is obtained in the above experiment in view of disposing the holding tank during the course of feeding a large amount of sea water to the ballast tank and operational convenience in setting the holding time.

As mentioned above, if the contact time is 0.05 to 10 min., the concentration of the residual available chlorine contained in the chlorine bactericide may be appropriately adjusted in the range of 0.1 to 100 mg/L depending on sea water to be treated, to limit the generation of trihalomethanes and to destroy bacteria. Therefore, if the holding tank is provided which makes it possible that the time (namely, holding time) taken from when the chlorine bactericide is supplied until hydrogen peroxide is supplied is 0.05 to 10 min., in order for the contact time to be 0.05 to 10 min., bacteria can be destroyed down to the treatment standard.

(14) In the apparatus according to the above (11), the holding tank is disposed in the ballast tank. If a part of the ballast tank is used as the holding tank, it is unnecessary to install a new holding tank. This makes it easy to remodel existing marine vessels and possible to decrease installation costs.

(15) As another modified embodiment of the above configuration, an apparatus for treating ballast water of the invention comprises: a chlorine bactericide supply apparatus that supplies chlorine bactericide to sea water; a holding tank that retains the sea water to which the chlorine bactericide is added, for a prescribed time; and a chlorine reducing agent supply apparatus that supplies chlorine reducing agent to the sea water retained in the holding tank for the prescribed time.

Though bacteria and plankton can be destroyed by supplying chlorine bactericide in sea water, the chlorine bactericide left unremoved after bacteria is destroyed reacts with organic substances contained in sea water to produce trihalomethanes. As shown in the foregoing FIG. 4, the generation of trihalomethanes is continued until residual chlorine is completely disappeared and the concentration of the trihalomethanes is increased with time. In the example shown in FIG. 4, the amount of trihalomethanes to be produced one minute after the chlorine bactericide is added is about 1/10 or less of the total amount of trihalomethanes. It is found from the above result that if a chlorine-reducing agent is supplied immediately after bacteria is destroyed by supplying chlorine bactericide, to make residual chlorine lose its effect, the generation of trihalomethanes can be suppressed. On the other hand, bacteria and plankton having a size less than 50 μm can be almost destroyed in a short time by a chlorine bactericide. However, in order to destroy plankton 50 μm or larger in size, it is necessary to leave available chlorine in sea water for a certain period of time. However, if available chlorine is left unremoved in sea water for a long time to destroy the plankton 50 μm or larger in size, trihalomethanes eventually increase.

Given with this situation, in the apparatus according to the above (15), the following process is adopted to properly secure the time during which available chlorine is brought into contact with sea water and to suppress the amount of trihalomethanes produced due to residual chlorine left unremoved for a long time in order to destroy bacteria and plankton by the chlorine bactericide. Specifically, after the chlorine bactericide is supplied to ballast water, the ballast water is introduced into a holding tank and retained in the holding tank only for the time required for the treatment of bacteria by available chlorine to carry out sterilization treatment. Next, a chlorine reducing agent is supplied to the sea water discharged from the holding tank to reduce residual chlorine, thereby making the residual chlorine lose its effect to thereby suppress the generation of trihalomethanes. As mentioned above, after sea water is brought into contact with available chlorine for a short time, a chlorine reducing agent is supplied for reduction of residual chlorine, thereby reducing residual chlorine to make residual chlorine lose its effect.

Here, the term "hold" means that bacteria and the chlorine bactericide in sea water are put into a contact state from when hydrogen peroxide is supplied to sea water until hydrogen peroxide is supplied regardless of the flow condition of sea water. Namely, the term "hold" involves maintaining the state where sea water is kept in a vessel and absolutely stops flowing and the state where sea water is allowed to flow at a fixed flow rate in a pipe. Therefore, the term "holding tank" here includes a wide range of reserving units typified by not only a reservoir that keeps sea water but also a retaining pipe in which sea water is allowed to flow at a fixed rate. As the chlorine bactericide, sodium hypochlorite, calcium hypochlorite or chlorine gas is used. When any of these compounds is used, available chlorine is present in the form of a hypochlorous acid or hypochlorous acid ion in sea water. Also, as the chlorine reducing agent, sodium sulfite, sodium thiosulfite or aqueous hydrogen peroxide is used.

(16) Preferably, in the apparatus for treating ballast water according to the above (15), the time during which the sea water is retained in the holding tank from when the chlorine bactericide is supplied until the chlorine reducing agent is supplied can be set in the range of 0.5 to 20 minutes.

It is necessary that the holding time in the holding tank be sufficient to destroy bacteria and be within the time during which the generation of trihalomethanes can be prevented. As shown in FIG. 4, if the time elapsed after the chlorine bactericide is supplied is designed to be 20 minutes or less, that is, if the holding time is 20 minutes or less, the concentration of trihalomethanes can be limited to 0.2 mg/L or less which gives rise to no problem. Therefore, the holding time is preferably designed to be 20 minutes or less from the viewpoint of suppressing the generation of trihalomethanes.

On the other hand, it is necessary to keep sea water in the holding tank until bacteria and plankton are destroyed from the viewpoint of destroying bacteria and plankton. Given with this situation, the holding time required to destroy bacteria was investigated. According to the IMO approved test standard for treating ballast water, it is required to reduce the number of plankters to $10/m^3$ or less after ballast water is treated when raw water in which the number of plankters 50 μm or larger in size is $10^5/m^3$ or more is treated. Given with this situation, the relation between the contact time of bacteria and plankton in sea water with residual available chlorine and the concentration of residual chlorine in sea water, which relation is required to meet this standard was found.

FIG. 6 shows the relation between the contact time of bacteria and plankton in sea water with residual available chlorine and the concentration of residual chlorine in sea water, in a both-axis logarithmic graph, wherein the ordinate is the concentration of residual chlorine (mg/L) and the abscissa is the contact time (minute). As shown in FIG. 6, the contact time can be shortened if the concentration of residual chlorine is made large. The results obtained in this experiment shows that 0.5 min. is enough for the contact time if the concentration of residual chlorine is 100 mg/L. If the contact time is 20 min., on the other hand, a necessary concentration of residual chlorine is 5 mg/L.

From the results shown in the graph of FIG. 6, it has been clarified that the holding time in the holding tank, that is, the contact time between bacteria or plankton and residual available chlorine can be set to a significantly short time if the concentration of residual chlorine is increased. However, 0.5 min. is preferably the lower limit which is obtained in the above experiment in view of disposing the holding tank during the course of feeding a large amount of sea water to the ballast tank and operational convenience in setting the holding time.

As mentioned above, if the contact time is 0.5 to 20 min., the concentration of the residual available chlorine contained in the chlorine bactericide may be appropriately adjusted in the range of 5 to 100 mg/L depending on sea water to be treated, to limit the generation of trihalomethanes and to destroy bacteria and plankton. Therefore, if the holding tank is provided which makes it possible that the time (holding time) taken from when the chlorine bactericide is supplied until the chlorine reducing agent is supplied is 0.5 to 20 min., in order for the contact time to be 0.5 to 20 min., bacteria and plankton can be destroyed down to the treatment standard.

(17) As another modified embodiment of the above configuration, an apparatus for treating ballast water of the invention comprises: a chlorine bactericide supply apparatus that supplies chlorine bactericide to sea water; a holding tank that retains the sea water to which the chlorine bactericide is added, for a prescribed time; and an activated carbon treatment apparatus that introduces the sea water retained in the holding tank for the prescribed time to carry out activated carbon treatment.

In the above modified embodiment, activated carbon treatment is carried out in place of the reducing treatment to make residual chlorine lose its effect in sea water. In the above modified embodiment, the following process is adopted. Specifically, after the chlorine bactericide is added to sea water, the sea water is held in the holding tank such that available chlorine is left only for the time required for destroying bacteria and plankton and for the time during which the generation of trihalomethanes can be suppressed. Next, the sea water is allowed to pass through an activated carbon treatment apparatus to reduce residual chlorine by activated carbon, thereby suppressing the generation of trihalomethanes and also adsorbing the produced trihalomethanes to remove them. As the activated carbon treatment apparatus, a type in which activated carbon is fluidized gently in a vessel or a type in which activated carbon is filled can be used.

Also, a treatment material that can reduce residual chlorine to decompose it and can also adsorb trihalomethanes may be used in place of activated carbon. Also, an adsorbing vessel provided with an adsorbing material that adsorbs trihalomethanes may be disposed in place of the activated carbon treatment apparatus and a chlorine reducing agent may be supplied to sea water held in the holding tank for the prescribed time. Residual chlorine is reduced by a chlorine reducing agent to make the residual chlorine lose its effect and the produced trihalomethanes are adsorbed by the adsorbing material in the adsorbing vessel. As the adsorbing material, a resin type adsorbing material can be used.

(18) Preferably, in the apparatus for treating ballast water according to the above (17), the time during which the sea water is retained in the holding tank from when the chlorine bactericide is supplied until the activated carbon treatment is started can be set in the range of 0.5 to 20 minutes.

As described previously, if the holding time in the holding tank, that is, the contact time between bacteria or plankton and residual available chlorine is designed to be 0.5 to 20 min., the concentration of the residual available chlorine contained in the chlorine bactericide can be appropriately adjusted in the range of 5 to 100 mg/L depending on sea water to be treated, to limit the generation of trihalomethanes and to destroy bacteria and plankton. Therefore, if the holding tank is provided which makes it possible that the time (holding time) taken from when the chlorine bactericide is supplied until activated carbon treatment is started is 0.5 to 20 min., in order for the contact time to be 0.5 to 20 min., bacteria and plankton can be destroyed down to the treatment standard.

(19) In the apparatus according to the above (15) to (18), the holding tank is disposed in the ballast tank. If a part of the ballast tank is used as the holding tank, it is unnecessary to install a new holding tank. This makes it easy to remodel existing marine vessels and possible to decrease installation costs.

(20) Preferably, the apparatus for treating ballast water according to the above (11) to (19) further comprises a filter that filters sea water to trap aquatic organisms, on the upstream side of the chlorine bactericide supply apparatus.

A filter is disposed upstream of the chlorine bactericide supply apparatus, which ensures that relatively large aquatic organisms such as zooplankton in sea water can be trapped and removed. For this reason, the amount of the chlorine bactericide to be supplied can be further reduced than in the case of providing no filter, with the result that the generation of trihalometnanes can be further suppressed to decrease an influence on the environment. Along with this, the amount of hydrogen peroxide or chlorine reducing agent to be supplied can also be reduced and also, the holding tank can also be made smaller. As the filter, one having a sieve opening in the range of 10 to 200 µm is preferably used and it is particularly preferable to use a filter having a sieve opening of about 20 to 35 µm because the trapping rate and the frequency of backwashing can be set optimally.

(21) A method for treating ballast water of the invention comprises: a filtering step of filtering sea water to trap aquatic organisms; a bactericide supply step of supplying bactericide to the filtrate sea water; and a cavitation treatment step of introducing the sea water to which the bactericide is added, into a venturi tube to generate cavitation in the sea water.

(22) Preferably, the method for treating ballast water according to the above (21) further comprises a bactericide-decomposer supply step of supplying bactericide-decomposer to the sea water to which the bactericide is added.

(23) As a modified embodiment of the above process, a method for treating ballast water of the invention comprises:

a water-intake treatment step including: a filtering step of filtering sea water to trap aquatic organisms; a bactericide supply step of supplying bactericide to the filtrate sea water; a cavitation treatment step of introducing the sea water to which the bactericide is added, into a venturi tube to generate cavitation in the sea water; and a water accumulating step of feeding the sea water which is subjected to the cavitation treatment, to a ballast tank; and a water-discharging treatment step including: a bactericide-decomposer supply step of supplying bactericide-decomposer to the sea water withdrawn from the ballast tank; a diffusing step of introducing the sea water to which the bactericide-decomposer is added, to diffuse the bactericide-decomposer in the sea water; and a water discharge step of discharging the sea water in which the bactericide-decomposer is diffused, into the sea.

If such a structure is provided, relatively large aquatic organisms such as zooplankton in sea water are trapped by the filter to remove them when sea water is fed to the ballast tank from the sea, and bacteria and relatively small plankton are destroyed by the bactericide and the cavitation produced by the venturi tube, whereby the sea water treated to destroy organisms can be kept in the ballast tank. Moreover, when sea water is discharged to the sea from the ballast tank, the bactericide left unremoved in the sea water is decomposed by the bactericide-decomposer to remove the influence of the bactericide on the sea area. In addition, if a step of diffusing the bactericide-decomposer in sea water is provided, the bactericide-decomposer is diffused in sea water in a short time to thereby decompose the bactericide in a short time. Therefore, the bactericide can be made harmless without fail while discharging the sea water from the ballast tank. Also, if the concentration of the bactericide in sea water to be kept in the ballast tank is kept appropriately, regrowth of bacteria and plankton can be suppressed.

(24) As a modified embodiment of the above process, a method for treating ballast water of the invention comprises:

a water-intake treatment step including: a filtering step of filtering sea water to trap aquatic organisms; a hydrogen peroxide supply step of supplying hydrogen peroxide to the filtrate sea water; a cavitation treatment step of introducing the sea water to which hydrogen peroxide is added, into a venturi tube to generate cavitation in the sea water; and a water accumulating step of feeding the sea water which is subjected to the cavitation treatment, to a ballast tank; and a water-discharging treatment step including: a hydrogen peroxide-decomposer supply step of supplying hydrogen peroxide-decomposer to the sea water withdrawn from the ballast tank; a diffusing step of introducing the sea water to which the hydrogen peroxide-decomposer is added, to diffuse the hydrogen peroxide-decomposer in the sea water; and a water discharge step of discharging the sea water in which the hydrogen peroxide-decomposer is diffused, into the sea.

If such a structure is provided, relatively large aquatic organisms such as zooplankton in sea water is trapped by the filter to remove them when sea water is fed to the ballast tank from the sea, and bacteria and relatively small plankton are destroyed by the hydrogen peroxide and the cavitation produced by the venturi tube, whereby sea water treated to destroy organisms can be kept in the ballast tank. Moreover, when sea water is discharged to the sea from the ballast tank, hydrogen peroxide left unremoved in the sea water is decomposed by the bactericide-decomposer to remove the influence of hydrogen peroxide on the sea area. In addition, harmful byproducts are not produced since hydrogen peroxide is used as the bactericide.

Also, the provision of the diffusing process that diffuses the hydrogen peroxide-decomposer in sea water ensures that sea water can be made harmless exactly while discharging sea water to the sea from the ballast tank because the hydrogen peroxide-decomposer is diffused in sea water in a short time to decompose hydrogen peroxide in a short time.

Also, if the concentration of hydrogen peroxide in sea water to be kept in the ballast tank is kept appropriately, regrowth of bacteria and plankton can be suppressed. Also, as the hydrogen peroxide-decomposer to be supplied, reducing agents that reduce and decompose hydrogen peroxide, such as sodium sulfite, sodium bisulfite (sodium hydrogen sulfite) and sodium thiosulfate can be used.

(25) Preferably, in the method for treating ballast water according to (21) to (24), a filter having a sieve opening in the range of 10 to 200 μm in the filtering step.

(26) Preferably, in the method for treating ballast water according to (21) to (24), the amount of the sea water fed to the venturi tube is set such that the flow rate at the throat part of the venturi tube is 10 to 40 m/sec.

The reason why the flow rate of sea water is set like this is as follows. When a ballast water treatment apparatus is installed in the middle of a pipe through which sea water is taken in and fed to the ballast tank, the flow rate of sea water in the pipe is usually 2 to 3 m/s at the inlet of the venturi tube. If the flow rate at the throat part of the venturi tube is less than 10 m/sec, the rising rate of the flow rate at the throat part is insufficient and a sharp drop in static pressure along with the rise in flow rate is available insufficiently, so that cavitation is not generated even under atmospheric pressure. If the flow rate at the throat part of the venturi tube is higher than 40 m/s on the other hand, a cavitation phenomenon occurs excessively, bringing about excessive pressure loss as the sea water travels through the venturi tube, leading to an excessive increase in energy consumed for sending water, which requires large pump power, bringing about high costs.

(27) In the method for treating ballast water according to the above (21) to (24), sea water is fed to the venturi tube such that the pressure head loss of the venturi tube is 5 to 40 m. This reason is that if the head loss is less than 5 m, any cavitation cannot be produced whereas if the head loss is larger than 40 m, a large flow pump that is provided in a marine vessel as a ballast pump cannot cope with this.

(28) In the method for treating ballast water according to the above (21) to (23), sodium hypochlorite can be used as the bactericide. In this case, the amount of sodium hypochlorite to be supplied is adjusted in the bactericide supply step such that the concentration by weight of available chlorine in sea water is 1 to 100 mg/L. This reason is that if the concentration by weight of available chlorine is less than 1 mg/L, hypochlorous acid reacts with reducing substances or organic material in water and therefore is not left, whereas if the concentration by weight of available chlorine is more than 100 mg/L, there are the problem concerning corrosion and the problem that a reserving vessel of sodium hypochlorite is increased in size, causing high costs.

(29) In the method for treating ballast water according to the above (21) to (23), preferably, the amount of sodium hypochlorite to be added is adjusted such that the redox potential of the sea water to which the bactericide is added in the bactericide supply step is 800 mV or higher when sodium hypochlorite is added as the bactericide.

Sodium hypochlorite to be added to destroy bacteria is consumed also by a reducing agent contained in sea water. Sea water to be taken on the ballast water is different in water quality and also in the content of reducing agents depending on the sea area. For this reason, the amount of sodium hypochlorite to be supplied must be adjusted to that conformed to the water quality to destroy bacteria sufficiently. In order to adjust the amount of sodium hypochlorite to be supplied, to that conformed to the water quality, the redox potential of the sea water to which sodium hypochlorite is supplied is measured, and the amount of sodium hypochlorite is controlled such that the redox potential is 800 mV or higher with respect to a silver/silver chloride electrode. If the redox potential is made to be 800 mV or higher, the concentration of chlorine left in the sea water can be made to have a concentration enough to destroy bacteria.

(30) As a modified embodiment of the above process, a method for treating ballast water of the invention comprises: a filtering step of filtering sea water to trap aquatic organisms; a cavitation treatment step of introducing the filtrate sea water into a venturi tube to generate cavitation in the sea water; and a ultraviolet radiation sterilizing step of destroying bacteria in the sea water treated in this manner.

(31) As another modified embodiment of the above process, a method for treating ballast water of the invention comprises: a chlorine bactericide supply step of supplying chlorine bactericide to sea water; a holding step of retaining the sea water to which the chlorine bactericide is added, for a prescribed time; and a hydrogen peroxide supply step of supplying hydrogen peroxide to the sea water retained for the prescribed time.

(32) In the method for treating ballast water according to the above (31), preferably the holding time required to hold sea water in the holding step is in the range of 0.05 to 10 min. The term "holding time" means a time taken from when the chlorine bactericide is supplied until hydrogen peroxide is supplied.

(33) In the method for treating ballast water according to the above (31), preferably the amount of the chlorine bactericide to be supplied is adjusted such that the concentration by weight of available chlorine in the sea water is in the range of 0.1 to 100 mg/L.

Bacteria can be destroyed down to the treatment standard by adjusting the amount of the chlorine bactericide even if the water quality (concentrations of organic materials) and the type and amount of living plankton and bacteria are different. Moreover, when the amount of the chlorine bactericide to be supplied is adjusted such that the concentration by weight of available chlorine in the sea water is in the range of 0.1 to 100 mg/L depending on the holding time in the holding step, the generation of trihalomethanes can be suppressed and bacteria can be destroyed. When the concentration by weight of available chlorine in sea water is less than 0.1 mg/L, the residual amount of available chlorine used to sterilize bacteria is insufficient because available chlorine is consumed by reactions with reducing substances and organic materials in sea water. When the concentration by weight of available chlorine in sea water exceeds 100 mg/L, on the other hand, there are the problem concerning corrosion and the problem that the cost of the chlorine bactericide and a reserving vessel of sodium hypochlorite are increased in size, causing high costs.

(34) In the method for treating ballast water according to the above (31), preferably the amount of hydrogen peroxide to be supplied is adjusted such that the concentration by weight of hydrogen peroxide in sea water is 0.1 to 200 mg/L. When the amount of hydrogen peroxide to be supplied is adjusted in this manner, available chlorine left in the sea water after the holding step is reduced to thereby suppress the generation of trihalomethanes and also, living plankton left unremoved even after the treatment using the chlorine bactericide can be destroyed down to the treatment standard. Moreover, hydrogen peroxide is made to remain in ballast water kept in the ballast tank, thereby making it possible to maintain the ballast water treatment standard. When the concentration by weight of hydrogen peroxide in sea water is less than 0.1 mg/L, residual available chlorine cannot be sufficiently reduced and also plankton cannot be destroyed. When the amount of hydrogen peroxide exceeds 200 mg/L, the amount of the hydrogen peroxide-decomposer to be supplied is increased, posing a problem of high costs and the like.

(35) The method for treating ballast water according to the above (31) to (34) preferably further comprises a filtration step of filtering sea water to trap aquatic organisms before the chlorine bactericide supply step.

If the filtration step for filtering sea water to trap aquatic organisms is provided before the chlorine bactericide supply step, relatively large aquatic organisms such as zooplankton in sea water can be trapped and removed in the filtration step. For this reason, the amount of a chlorine bactericide to be supplied can be further reduced than in the case of providing no filtration step, so that the generation of trihalomethanes can be further suppressed, making it possible to reduce the influence on the environment.

Also, the amount of hydrogen peroxide to be supplied can be decreased, leading to a reduction in the size of the holding tank. As the filter, one having a sieve opening in the range of 10 to 200 μm is preferably used and it is particularly preferable to use a filter having a sieve opening of about 20 to 35 μm because the trapping rate and the frequency of backwashing can be set optimally.

(36) As another modified embodiment of the above process, a method for treating ballast water of the invention comprises: a chlorine bactericide supply step of supplying chlorine bactericide to sea water; a holding step of retaining the sea water to which the chlorine bactericide is added, for a prescribed time; and a chlorine reducing agent supply step of supplying chlorine reducing agent to the sea water retained for the prescribed time.

(37) Preferably, in the method for treating ballast water according to the above (36), the time required from when the chlorine bactericide is supplied until the chlorine reducing agent is supplied is in the range of 0.5 to 20 minutes in the holding step.

(38) Preferably, in the method for treating ballast water according to the above (36), the amount of the chlorine bactericide to be supplied is adjusted such that the concentration by weight of available chlorine in the sea water is in the range of 5 to 100 mg/L in the chlorine bactericide supply step.

If the amount of the chlorine bactericide to be supplied is adjusted such that the concentration by weight of available chlorine in sea water is in the range of 5 to 100 mg/L, bacteria and plankton can be destroyed down to the treatment standard by adjusting the amount of the chlorine bactericide even if the water quality (for example, concentrations of organic materials) and the type and amount of living plankton and bacteria are different. Moreover, when the amount of the chlorine bactericide to be supplied is adjusted such that the concentration by weight of available chlorine in the sea water is in the range of 5 to 100 mg/L depending on the holding time in the holding step, the generation of trihalomethanes can be suppressed and bacteria and plankton can be destroyed. When the concentration by weight of available chlorine in sea water is less than 5 mg/L, the residual amount of available chlorine used to sterilize bacteria is insufficient because available chlorine is consumed by reactions with reducing substances and organic materials in sea water. When the concentration by weight of available chlorine in sea water exceeds 100 mg/L, on the other hand, there are the problem concerning corrosion and the problem that the cost of the chlorine bactericide and a reserving vessel of sodium hypochlorite are increased in size, causing high costs.

(39) As another modified embodiment of the above process, a method for treating ballast water of the invention comprises: a chlorine bactericide supply step of supplying chlorine bactericide to sea water; a holding step of retaining the sea water to which the chlorine bactericide is added, for a prescribed time; and an activated carbon treatment step of carrying out activated carbon treatment of the sea water retained for the prescribed time.

(40) Preferably, in the method for treating ballast water according to the above (39), the time required from when the chlorine bactericide is supplied until the activated carbon treatment is started is in the range of 0.5 to 20 minutes.

(41) Preferably, in the method for treating ballast water according to the above (39), the amount of the chlorine bactericide to be supplied is adjusted such that the concentration by weight of available chlorine in the sea water is in the range of 5 to 100 mg/L.

(42) Preferably, the method for treating ballast water according to the above (36) to (41) further comprises a filtering step of filtering sea water to trap aquatic organisms prior to the chlorine bactericide supply step.

If the filtration step for filtering sea water to trap aquatic organisms is provided prior to the chlorine bactericide supply step, relatively large aquatic organisms such as zooplankton in sea water can be trapped and removed in the filtration step. For this reason, the amount of a chlorine bactericide to be supplied can be further reduced than in the case of providing no filtration step, so that the generation of trihalomethanes can be further suppressed, making it possible to reduce the influence on the environment. Also, the amount of hydrogen peroxide to be supplied can be decreased, leading to a reduction in the size of the holding tank. As the filter, one having a sieve opening in the range of 10 to 200 μm is preferably used and it is particularly preferable to use a filter having a sieve opening of about 20 to 35 μm because the trapping rate and the frequency of backwashing can be set optimally.

According to the apparatus for treating ballast water described in the above (1) and the method for treating ballast water described in the above (21), aquatic organisms are trapped and removed by filtering sea water and a bactericide is supplied to the filtrate sea water; the sea water to which the bactericide is added is introduced into a venturi tube to cause cavitation in the sea water to thereby diffuse the bactericide in the sea water and to damage or destroy aquatic organisms in the sea water. Therefore, the ballast water treatment standard specified by the IMO, which standard can be scarcely attained by conventional methods, can be achieved at low costs without fail, and foreign organisms and infectious pathogenic bacteria can be prevented from transferring.

According to the apparatus for treating ballast water described in the above (3) and (4) and the method for treating ballast water described in the above (23) and (24), sea water is filtered to trap and remove aquatic organisms when the sea water is fed from the sea to the ballast tank and bacteria and plankton are destroyed by the bactericide such as hydrogen peroxide and cavitation produced by the venturi tube, whereby the sea water treated to destroy organisms can be kept in the ballast tank. Moreover, when sea water is discharged from the ballast tank, the bactericide such as hydrogen peroxide left unremoved in the sea water is decomposed by the hydrogen peroxide-decomposer or the like, thereby enabling the elimination of the influence on the sea area.

According to the apparatus for treating ballast water described in the above (11) and the method for treating ballast water described in the above (31), the chlorine bactericide is supplied to sea water accumulated in the ballast tank of a marine vessel and is kept for a prescribed time and then, hydrogen peroxide is supplied to the sea water, whereby bacteria and plankton in the sea water can be destroyed. This provides the possibility of a supply of sea water containing no harmful organisms, which water meets the ballast water treatment standard specified by the IMO and can also limit the generation of trihalomethanes produced from the chlorine bactericide.

Also, according to the apparatus for treating ballast water described in the above (15) and (17) and the method for treating ballast water described in the above (36) and (39), the chlorine bactericide is supplied to sea water accumulated in the ballast tank of a marine vessel and is retained for a prescribed time and then, the chlorine reducing agent is supplied or treatment using activated carbon is carried out, whereby bacteria and plankton in the sea water can be destroyed. This provides the possibility of a supply of sea water containing no harmful organisms, which water meets the ballast water treatment standard specified by the IMO, and can also limit the generation of trihalomethanes produced from the chlorine bactericide.

BRIEF DESCRIPTION OF DRAWINGS

FIG. 1 is a block diagram of an apparatus for treating ballast water according to an embodiment of the present invention.

BEST MODE FOR CARRYING OUT THE INVENTION

Embodiment 1

Figure 2:
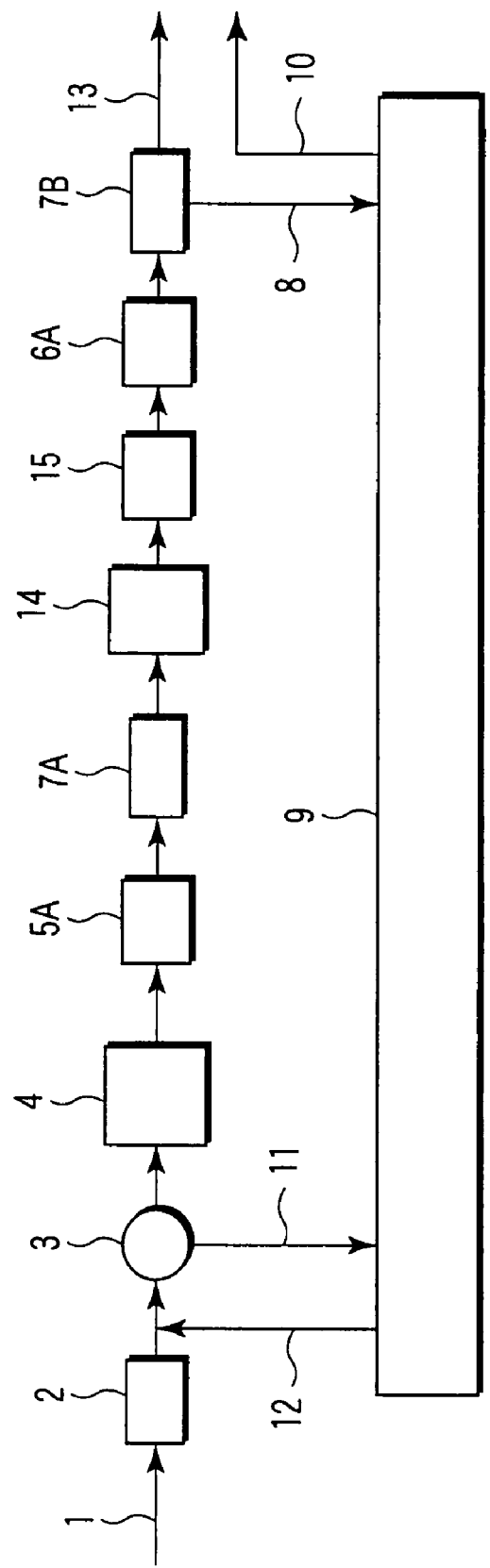
FIG. 2 is a block diagram of an apparatus for treating ballast water according to another embodiment of the present invention.

Examples of an embodiment of an apparatus for treating ballast water according to the present invention will be explained in detail with reference to the drawings.

FIG. 1 is a block diagram of an apparatus for treating ballast water according to a first embodiment of the present invention. This apparatus for treating ballast water is provided with the following structure. A sea water intake line 1 introduces sea water into a vessel. A coarse filter 2 removes coarse substances in the sea water introduced from the sea water intake line 1. A pump 3 introduces sea water or feeds ballast water in a ballast tank 9 (which will be explained later) to a filter 4 (which will be explained later). The filter 4 removes plankton existing in the sea water from which coarse substances are removed by the coarse filter 2. A bactericide supply apparatus 5 supplies bactericide to the sea water filtered by the filter 4 to destroy bacteria and plankton. A bactericide-decomposer supply apparatus 6 supplies bactericide-decomposer to the sea water to which the bactericide is added. A venturi tube 7 introduces the sea water (filtered water) to which the bactericide and the bactericide-decomposer have been added and generates cavitation in the sea water to damage or destroy aquatic organisms and also to diffuse the bactericide supplied from the bactericide supply apparatus 5 in the sea water. A treated water feed line 8 feeds the treated sea water discharged from the venturi tube 7 to a ballast tank (which will be explained later). The ballast tank 9 holds the treated sea water fed from the treated water feed line 8 or untreated sea water. A treated water discharge line 10 discharges the treated ballast water in the ballast tank 9 to the sea. An untreated sea water feed line 11 feeds untreated sea water to the ballast tank 9. A ballast water supply line 12 feeds untreated ballast water in the ballast tank 9 to the filter 4 side. A treated water discharge line 13 discharges the treated ballast water into the sea.

Each apparatus will be explained in more detail.

<Coarse Filter>

Sea water is taken in from a sea chest (sea water suction port) provided on the side of the vessel through the sea water intake line 1 by a pump 3. The coarse filter 2 removes coarse substances about 10 mm or larger in size among various small to large size foreign matters and aquatic organisms contained in the introduced sea water. As the coarse filter, a cylindrical strainer with holes about 10 mm in size, a hydrocyclone that separates coarse substances in a water stream by a difference in specific gravity or an apparatus in which coarse substances are trapped by a rotary screen and recovered by scraping may be used.

<Filter>

The filter 4 is installed to remove plankton existing in sea water from which coarse substances have been removed by the coarse filter 2. A filter having a sieve opening of 10 to 200

µm is used. The reason why the sieve opening is designed to be 10 to 200 µm is that it is intended to reduce the frequency of backwashing while keeping the rate of trapping of zooplankton and phytoplankton at a certain level to thereby shorten the time required for treating ballast water at a port of call. In other words, if the sieve opening exceeds 200 µm, the rate of trapping of zooplankton and phytoplankton is significantly decreased, whereas if the sieve opening is less than 10 µm, the frequency of backwashing is increased and therefore, the time required to treat ballast water at the port of call is longer, showing that both of these cases are undesirable. It is particularly preferable to use a filter having a sieve opening of about 20 to 35 µm because the trapping rate and the frequency of backwashing can be set optimally. Also, it is preferable that the filter 4 enable a filtering rate of 200 m$^3$/1 m$^2$ of a filter area or more per day. However, the present invention is not limited to this in the case where the filter can be made smaller by integrating filter modules.

As to specific examples of the filter 4, a notch wire filter or wedge wire filter is preferably used.

The notch wire filter is a type of filter in which a cylindrical element obtained by winding wires having notches (projections) around a frame are wound is held in a casing and which is also provided with a valve and a pipe for feeding water and for reverse washing. The intervals among wires are kept and the dimension of a filter path of the cylindrical element is defined by the notches. The dimension of a filter path is preferably 10 to 200 µm. Specific examples of this notch wire filter include a notch wire filter manufactured by Kanagawa Kiki Kogyo Co., Ltd. Jpn. Pat. Appln. KOKAI Publication No. 2001-170416 discloses an apparatus provided with a plurality of these notch filters as the filter elements and with a reverse washing means. Small ultrasonic vibrators are attached to a filter element collecting substrate and to each filter element to add ultrasonic vibration during reverse washing to increase a reverse washing effect, thereby extending the interval of the reverse washing, whereby filtering effect can be raised.

The wedge wire filter is a type of filter in which a cylindrical element obtained by winding wires having a triangle section around a frame is held in a casing and which is also provided with a valve and a pipe for feeding water and for reverse washing. The dimension of a filter path of the cylindrical element is defined by adjusting the intervals among wires. The dimension of a filter path is preferably 10 to 200 µm. Specific examples of this wedge wire filter include a wedge wire filter manufactured by Toyo Screen Kogyo (k.k.).

Preferable examples of the filter 4 include a laminate disk type filter. The laminate disk type filter is a type of filter in which donut type disks formed with plural slant grooves on both surfaces of each disk are fastened under pressure in the direction of the axis and laminated into a cyclic form. When sea water flows through clearances formed by the grooves of adjacent disks, aquatic organisms are filtered. The sieve opening is set to be 10 to 200 µm by properly setting the dimension of the slant groove. In the laminate disk type filter, the disks fastened under pressure are released during reverse washing to thereby widen the clearances, thereby removing filter residues. Specific examples of this laminate disk type filter include "Spin Klin Filter Systems" manufactured by Arkai Filtration Systems.

As the filter 4, besides the above two types of filters, other various filters, for example, a closed type sand filter, cloth filter and metal fiber filter may be used.

<Bactericide Supply Apparatus>

The bactericide supply apparatus 5 serves to supply a bactericide to sea water which is filtered by the filter 4 and introduced into the venturi tube 7 to destroy bacteria and plankton. As the bactericide to be supplied, sodium hypochlorite, chlorine, chlorine dioxide, hydrogen peroxide, ozone and peracetic acid, or mixtures of these compounds may be used. Also, bactericides other than the above bactericides can be used.

When sodium hypochlorite is used as the bactericide, it is preferably supplied such that the amount by weight of available chlorine in sea water is 1 to 100 mg/L. This reason is that if the concentration by weight of sodium hypochlorite is less than 1 mg/L, hypochlorous acid reacts with reducing substances or organic material in water and therefore is not left, whereas if the concentration by weight of available chlorine is more than 100 mg/L, there are the problem concerning corrosion and the problem that a reserving vessel of sodium hypochlorite is increased in size, causing high costs.

Figure 7:
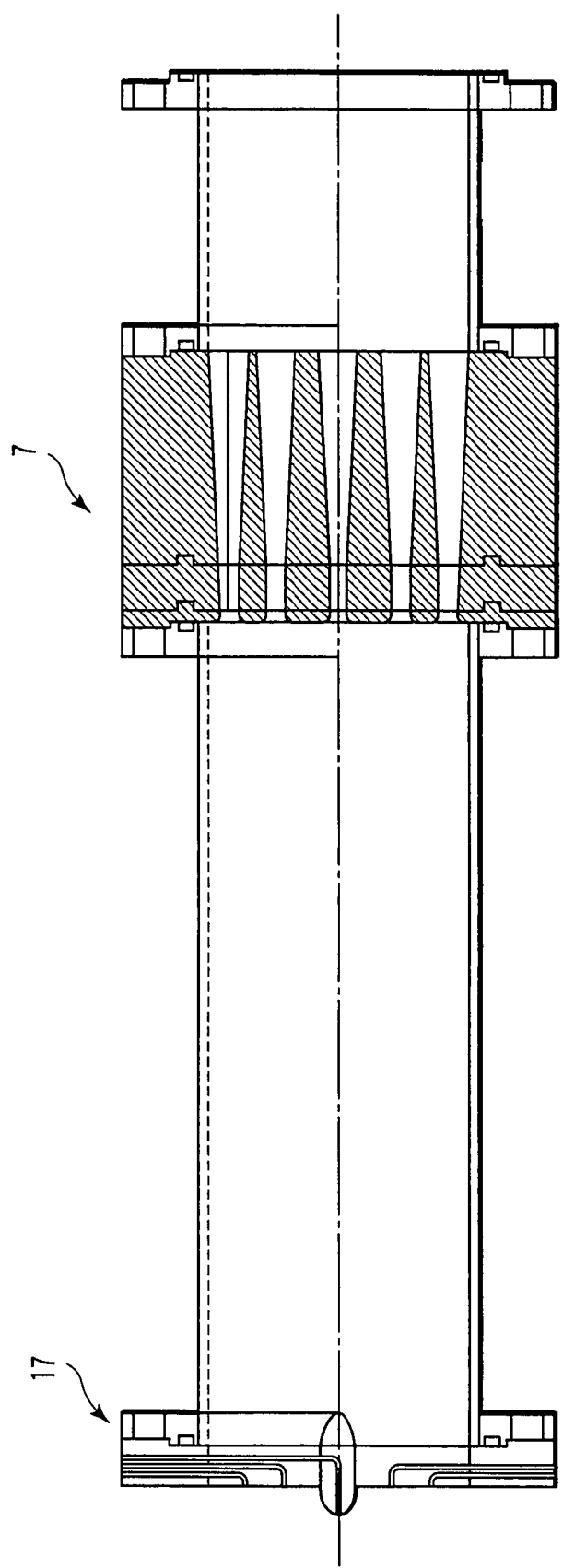
FIG. 7 is an explanatory view of a bactericide supply apparatus and a venturi tube which are to be used in an embodiment of the present invention.
Figure 8:
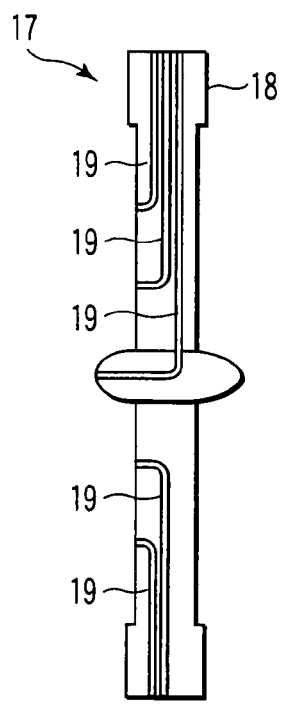
FIG. 8 is an explanatory view of an essential part of a bactericide supply apparatus which is to be used in an embodiment of the present invention.
Figure 9:
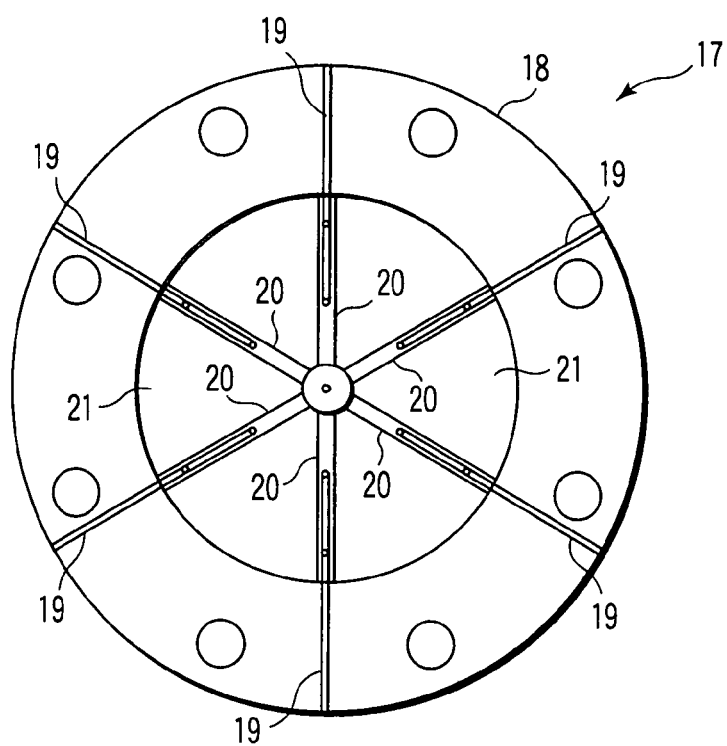
FIG. 9 is an explanatory view of an essential part of a bactericide supply apparatus which is to be used in an embodiment of the present invention.
Figure 10:
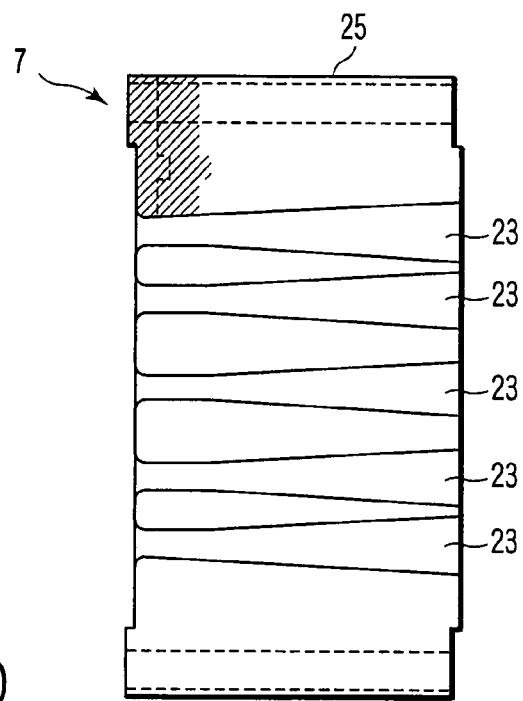
FIG. 10 is an explanatory view of a venturi tube used in an embodiment of the present invention.
Figure 11:
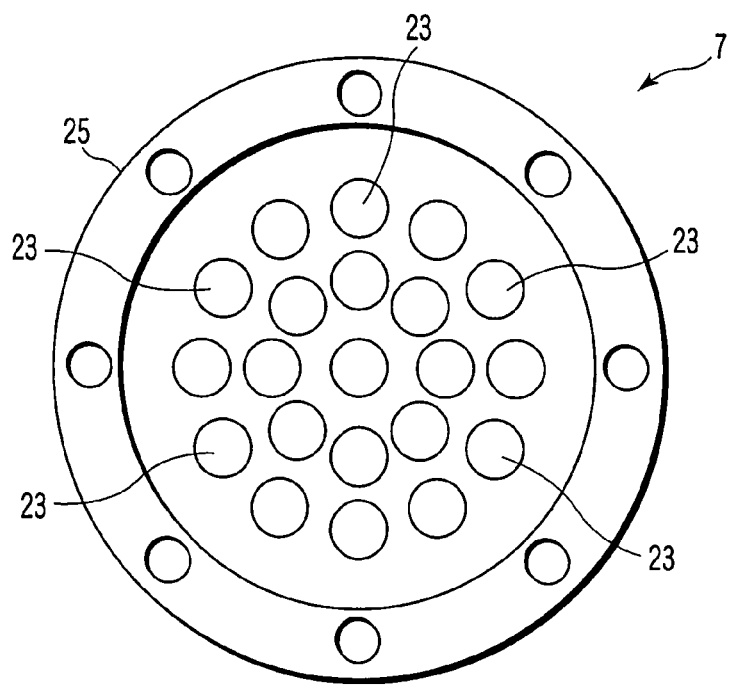
FIG. 11 is an explanatory view of a venturi tube used in an embodiment of the present invention.

FIG. 7 shows a bactericide injecting section 17 in the bactericide supply apparatus 5 and the venturi tube 7 disposed downstream side thereof. Sea water is made to flow toward the right from the left on FIG. 7. A bactericide-decomposer injection section of the bactericide-decomposer supply apparatus 6 is disposed between the bactericide injection section 17 and the venturi tube 7, though omitted in FIG. 7. The structure of the bactericide-decomposer injection section is the same as that of the bactericide injection section 17. FIG. 8 is an enlarged view of the bactericide injection section 17 shown in FIG. 7 and FIG. 9 is a view showing the state of the bactericide injection section 17 as viewed from the upstream pump side. The bactericide supply apparatus 5 and particularly the bactericide injection section 17 will be explained in detail with reference to FIGS. 7 to 9.

The bactericide injection section 17 is provided with a donut-like block body 18 and plural bactericide injection pipes 19. The block body 18 is provided with an opening 21 which is to be a conduit in the center thereof. One end of the bactericide injection pipe 19 is secured to the block body 18 and the other end is extended up to the opening 21. The bactericide injection pipe 19 is supported by a support section 20 made of a plate member extended in a radial direction in the opening 21. The support section 20 is disposed on six places at angular intervals of 60° in a circumferential direction in the opening 21. Each support section 20 supports 2 or 3 bactericide injection pipes 19. The opening section 21 side end of each of these bactericide injection pipes 19 is disposed a fixed distance apart from the center of the opening 21 in a radial direction. Also, the opening 21 side end of the bacteria injection pipe 19 is bent towards the upstream side and its distal end is opened against the flow and this opening is a bactericide injection port.

As mentioned above, plural support sections 20 are disposed in the peripheral direction of the opening 21, plural bactericide injection pipes 19 are supported by each support section 20 and the injection port of each bactericide injection pipe 19 is arranged a prescribed distance apart in the radial direction in each support section 20. As a result, the bactericide injection port of the bactericide supply pipe is arranged in the plural in each of the radial direction and peripheral direction of the section of the conduit. As shown in FIG. 8, the end of the bactericide injection pipe 19 is secured to the block body 18 and arranged so as to open from the outside peripheral surface of the block body 18, and a bactericide is supplied to this opening from the bactericide supply section (not shown).

In the bactericide supply apparatus 5 structured in the above manner, the bactericide is supplied to the upstream side of the venturi pipe 7. Therefore, the bactericide is diffused to some extent in the pipe by the time when it reaches the throat part of the venturi tube where cavitation occurs. Then, the progress of the diffusion and mixing of the bactericide is made by cavitation. This promotes the penetration of the bactericide into bacteria, thereby making it possible to increase a sterilization effect. Also, since the bactericide supply port of the bactericide injection port 19 is opened towards the upstream side, the injected bactericide is ejected in a direction opposite to the flow direction of the sea water flowing though a passage and therefore, the diffusion of the bactericide in sea water is promoted.

In the above example, an example is shown in which the bactericide is supplied to the upstream side of the venturi tube 7. However, the bactericide may be supplied to the throat part of the venturi tube besides the upstream side of the venturi tube, or may be supplied only to the throat part of the venturi tube. When the bactericide is supplied to the throat part of the venturi tube, it is automatically sucked by the ejector action of the venturi tube, and therefore a supply pump is unnecessary.

<Bactericide-Decomposer Supply Apparatus>

The bactericide-decomposer supply apparatus 6 supplies bactericide-decomposer to the sea water to which the bactericide has been added, to decompose the bactericide left unremoved in the sea water, thereby making the bactericide harmless. In this embodiment, because the bactericide-decomposer supply apparatus 6 is disposed between the bactericide supply apparatus 5 and the venturi tube 7, the bactericide-decomposer is rapidly diffused in the sea water by the cavitation of the venturi tube 7. The arrangement of the bactericide-decomposer supply apparatus 6 is not limited to this, but the bactericide-decomposer supply apparatus may be disposed downstream side of the venturi tube 7.

As the bactericide-decomposer to be supplied to chlorine bactericides such as sodium hypochlorite and chlorine, sodium thiosulfate, sodium sulfite and sodium bisulfite (sodium hydrogen sulfite) may be used. Also, as the bactericide-decomposer to be supplied to hydrogen peroxide, sodium thiosulfate, sodium sulfite, sodium bisulfite (sodium hydrogen sulfite) and enzymes such as catalase can be used. However, the bactericide-decomposer used in the present invention is not limited to the above compounds.

<Venturi Tube>

The venturi tube 7 generates cavitation and damages or destroys bacteria and plankton passing through the filter 4 by this cavitation and also, diffuses the bactericide supplied from the bactericide supply apparatus 5. FIG. 10 is a sectional view of the venturi tube 7 and FIG. 11 is a view of the venturi tube 7 as viewed from the upstream side. In this embodiment, the venturi pipe 7 is one in which plural small-aperture venturi tubes 23 are arranged in parallel as shown in FIGS. 10 and 11. In this example, one venturi tube is disposed in the center of the flow path and plural venturi tubes are arranged on two concentric circles around the center venturi. The way of arrangement is not limited to this. The venturi tube 23 will be explained hereinbelow.

The venturi 23 is constituted of a convergent part where the sectional area of the conduit gradually decreases, the throat part where the sectional area of the conduit is smallest and a spread part (diffuser part) where the sectional area of the conduit gradually increases. A sharp drop in static pressure along with a sharp rise in flow rate at the throat part brings about the generation of cavitation bubbles whereas a rise in pressure along with a drop of flow rate at the spread part brings about the growth and corruption of the cavitation bubbles. Bacteria and plankton in sea water are damaged or destroyed to death by impact pressure, shearing force, high temperature and OH radicals having strong oxidation ability, resulting from the corruption of the cavitation bubbles Also, the venturi tube 23 is made to generate cavitation to damage or destroy relatively small aquatic organisms such as phytoplankton and also to rapidly diffuse the bactericide in the sea water by the cavitation to increase a sterilizing effect. Because the mixing of the bactericide in the sea water is promoted by the diffusing action of the cavitation, the amount of the bactericide to be supplied can be further reduced than in the case of only injecting the bactericide. As a result, for instance, the generation of trihalomethanes which is a matter of concern when a chlorine bactericide is used as the bactericide is suppressed, making it possible to reduce the influence on the environment. Also, the supply of the bactericide-decomposer added to make the bactericide harmless is made to be unnecessary or reduced.

Moreover, the structure in which plural venturi tubes are arranged in parallel has the following effect.

a. Development of a Small-Sized Venturi Tube Apparatus

In the venturi tube apparatus of the present invention, plural venturi tubes are arranged in parallel. Therefore, unlike the case where a single venturi tube is large-sized, a dimension in the direction of the length is not increased though a large amount of sea water can be treated. Namely, the length of the venturi tube apparatus may be almost the same as that of a small-diameter venturi tube, and therefore, the venturi tube apparatus is free from a restriction on the space when it is mounted on a marine vessel and can be arranged appropriately.

b. Optimization of the Frequency of Generation of Cavitation Bubbles

Cavitation bubbles generated in the venturi tube are produced at the throat part where the flow rate is the highest and static pressure is dropped, and are grown with a distance towards the downstream side along the flow. The bubbles are increased in bubble diameter along with a rise in pressure due to a reduction in flow rate and rapidly collapse. The frequency of the generation of cavitation bubbles is high in the vicinity of the wall surface of the throat part of the venturi tube and is relatively low in the vicinity of the center of the tube. This is because there is a pressure distribution towards the center from wall surface of the tube, so that the static pressure in the vicinity of the wall surface of the tube is lower than that of the center of the tube.

The frequency of the generation of cavitation bubbles varies depending on the area of the wall surface of the venturi tube. If the venturi tube is simply large-sized while keeping geological similarity, the surface area of the wall surface of the venturi tube per unit amount of treated water is reduced though the surface area of the wall surface of the venturi tube is itself increased. Therefore, the frequency of the generation of cavitation bubbles is reduced, leading to reduced cavitation effect. Therefore, in order to increase the amount of water to be treated in the apparatus of the present invention, it is not preferable to increase the scale of the venturi tube while keeping geological similarity but preferable to increase the number of venturi tubes. This ensures that a large amount of water can be treated while securing the frequency of generation of cavitation bubbles per unit amount of water to be treated at the same level as in the case of small-diameter venturi tube.

c. Limitation to Scale Effect on Treatment Effect

With respect to a small-diameter venturi tube, of which the ability to treat harmful organisms and the ability to decompose harmful substances by cavitation have been confirmed, it is expected that a scale effect on treatment ability appears in the case where the diameter of the flow path at which the venturi tube is set is enlarged and the size of the venturi tube is scaled up according to this diameter to increase the throughput. However, the above apparatus enables such a measure as to increase the number of venturi tubes without changing the pipe diameter of the venturi tube. It is therefore possible to design a treatment apparatus enabling a large flow rate which suppresses the above scale effect on the treatment ability as much as possible, and to makes use of the ability specific to the small-diameter venturi tube of which the treatment ability has been confirmed.

When sea water is supplied to the venturi tube 23, it is preferable to design the flow amount of sea water such that the flow rate of sea water is 10 to 40 m/sec at the throat part of the venturi tube 23. This reason is as follows. When a ballast water treatment apparatus is installed in the middle of a pipe through which sea water is taken in and fed to the ballast tank, the flow rate of sea water in the pipe is usually about 2 to 3 m/s at the inlet of the venturi tube. If the flow rate at the throat part of the venturi tube 23 is less than 10 m/sec, the rising rate of the flow rate at the throat part is insufficient and a sharp drop in static pressure along with the rise in flow rate is insufficient, so that cavitation is not generated even under atmospheric pressure. If the flow rate at the throat part of the venturi tube is higher than 40 m/s on the other hand, a cavitation phenomenon occurs excessively, bringing about excessive pressure loss as the sea water travels through the venturi tube. This results in an excessive increase in energy consumed for sending water, which requires too large pump power, bringing about high operation and facility costs.

When sea water is fed to the venturi tube 23, the flow rate of sea water is preferably designed such that the pressure head loss of the venturi tube 23 is 5 to 40 m. This reason is that if the pressure head loss is less than 5 m, any cavitation cannot be produced whereas if the head loss is larger than 40 m, a large flow pump that is provided in a marine vessel as a ballast pump cannot cope with this.

The above venturi tube 7 is manufactured by forming plural venturi-shaped openings in a large-diameter column block 25 by machining. Alternatively, the venturi tube 7 may be manufactured as follows: a large-diameter column holder in which plural through-holes are formed in a large-diameter block 25 is prepared and a small-diameter venturi tube is inserted into this large-diameter column holder.

Also, the aperture (the ratio of the sum of the sectional areas of the throat parts of the venturi tube to the sectional area of the pipe at the inlet of the venturi tube) of the venturi tube 7 is preferably 7.5 to 20%. This reason is as follows. When a ballast water treatment apparatus is installed in the middle of a pipe through which sea water is taken in and fed to the ballast tank, the flow rate of sea water in the pipe is usually about 2 to 3 m/s at the inlet of the venturi tube. On the other hand, in order to generate fairly strong cavitation at the outlet of the venturi tube under atmospheric pressure, the flow rate at the throat part of the venturi tube must be about 10 to 40 m/s. In order to attain a flow rate of about 2 to 3 m/s at the inlet of the venturi tube and a flow rate of about 10 to 40 m/s at the throat part of the venturi tube, the aperture of the venturi tube is preferably designed to be 7.5 to 20%.

The interval between adjacent venturi pipes 23 is preferably 1.05 to 1.5 times the diameter D of the inlet of the venturi tube. This reason is as follows. If the interval between the axes of the venturi tubes 23 adjacent to each other is excessively small, the thickness of tube wall of the venturi tube 23 is too small, giving rise to a problem concerning the strength. Also, if the interval is excessively large, the ratio of the sum of the sectional area of the throat part of the venturi tube to the pipe sectional area at the inlet of the venturi tube apparatus on the upstream side is too small (the sectional area of the conduit is excessively converged), pressure loss at the venturi tube is increased and a large flow pump that is provided in a marine vessel as a ballast pump cannot cope with this.

A jet nozzle may be used to generate cavitation. However, because the jet nozzle is increased in pressure loss, is easily clogged and is increased in cost because of an increase in the size of a pump and in the frequency of reverse washing, it is unsuited to ballast water treatment standing in need of large throughput. On the contrary, a venturi tube is capable of generating cavitation even by small pressure loss and is therefore suited to ballast water treatment standing in need of large throughput.

Next, the action of the apparatus for treating ballast water structure in the above manner will be explained. When the pump 3 is operated, sea water is taken on by the vessel from the sea water intake line 1. At this time, coarse substances about 10 mm or larger in size among various large or small foreign materials and aquatic organisms existing in sea water are removed. The sea water from which coarse substances are removed is introduced into the filter 4 to remove zooplankton, phytoplankton and the like having a size corresponding to the sieve opening of the filter 4. Aquatic organisms and the like trapped by the filters 2 and 4 are returned to the sea by subjecting filters including the filters 2 and 4 to reverse washing. Even if these filter residues are returned to the sea, they have no influence on the biosystem because they are returned to the same sea area. In other words, because the ballast water is treated when it is taken onto the vessel, the water used for the reverse washing in the filters 2 and 4 can be discharged as it is.

A bactericide is supplied to the sea water filtered by the filter 4 from the bactericide supply apparatus 5 and then a bactericide-decomposer is supplied from the bactericide-decomposer supply apparatus 6. The sea water to which the bactericide and the bactericide-decomposer were added is introduced into the venturi tube 7. In the venturi tube 7, cavitation bubbles are generated in the sea water according to the foregoing mechanism and the grown cavitation bubbles suddenly collapse whereby impact pressure, shearing force, high temperature and the action of OH radicals having strong oxidation ability are added to aquatic organisms in the sea water, with the result that these aquatic organisms are damaged and destroyed. At this time, the cavitation in the venturi tube 7 promotes the diffusion of the bactericide in the sea water and increases the sterilizing effect of the bactericide since the bactericide is supplied to the sea water before the sea water is introduced into the venturi tube 7. Since the bactericide-decomposer is also supplied to the sea water before the sea water is introduced into the venturi tube 7, the diffusion of the bactericide-decomposer in the sea water is promoted and the effect of decomposing remaining bactericide is promoted.

The sea water treated in the venturi tube 7 is fed to the ballast tank 9 through the treated water feed line 8 and kept there. When the sea water is kept in the ballast tank, the bactericide supplied from the bactericide supply apparatus 5 preferably exists for a proper time. This is because even if harmful organisms are left in the ballast tank 9, these microorganisms can be destroyed by remaining sterilizing effect. The residual concentration of the bactericide is appropriately determined according to the type and concentration of the bactericide, the material of the ballast tank 9 and the type of coating. Based on this result, the amount of the bactericide-decomposer to be supplied from the bactericide-decomposer supply apparatus 6 is adjusted. The bactericide-decomposer is not supplied though depending on the case.

Also, though the bactericide is supplied to the upstream side of the venturi tube 7 and/or the throat part of the venturi tube 7 in the above example, it may be further supplied to the downstream side of the venturi tube 7. In this case, bacteria stuck to plankton and the like are separated by the cavitation, and therefore, the bactericide is made to act on these separated bacteria at the downstream side of the venturi tube 7, thereby making it possible to increase the sterilizing effect. Also, the bactericide is made to penetrate into the body of plankton living but damaged in its coat by the cavitation to increase the sterilizing effect. Also, plankton having strong resistance to sterilization can be destroyed using the bactericide in a smaller amount than in the case of treatment using the bactericide singly.

In the above example, the destruction treatment utilizing a bactericide and a venturi tube is carried out when sea water is taken into the ballast tank 9. However, the destruction treatment may be carried out not when sea water is taken on a vessel but when sea water is discharged from the ballast tank 9. In this case, untreated sea water is kept in the ballast tank 9 through the untreated sea water feed line 11. When this ballast water is discharged from the ballast tank 9, ballast water (untreated) in the ballast tank 9 is introduced into the filter 4 side through the ballast water supply line 12 and thereafter treated in the same manner as above. The treated ballast water is discharged into the sea through the treated water discharge line 13.

In this case, the ballast water to which the bactericide is added at the upstream side of the venturi tube 7 is discharged into the sea and therefore, the bactericide must be made harmless perfectly. Given with this situation, unlike the case of feeding the treated sea water to the ballast tank 9, the amount of the bactericide-decomposer to be supplied from the bactericide-decomposer supply apparatus 6 is designed to be enough to decompose the bactericide left unremoved, thereby preventing some influences from being exerted on the environment of the port where the ballast water is discharged.

Also, the treatment using the bactericide may be carried out both when sea water is taken into the ballast tank 9 and when sea water is discharged from the ballast tank 9. In this case, the treatment may be lightly carried out when the ballast water is discharged.

In this embodiment, as mentioned above, zooplankton and phytoplankton 10 to 200 μm in size are removed by the filter 4, bacteria and plankton which pass through the filter 4 are damaged or destroyed by the venturi tube 7 and further, a bactericide is added to destroy bacteria and plankton to death. Therefore, even if sea water has any water quality, the sea water can be made to meet the standard of ballast water specified by the IMO exactly and inexpensively. Also, because the structure of the apparatus is simple, this apparatus may be easily applied to existing marine vessels and microorganisms which are resistant to bactericide treatment and have resistance to electrical treatment can be efficiently destroyed.

In the example shown in FIG. 1, it is assumed that the treatment for making ballast water harmless is carried out when sea water is taken into the ballast tank and/or when sea water is discharged into the sea. In this case, which timing to carry out treatment, either when sea water is taken on or when sea water is discharged or at both times may be determined according to the amount of microorganisms living in the sea area concerned and to the navigation condition of a marine vessel.

Also, a method for treating ballast water will be explained in which the apparatus for treating ballast water as shown in FIG. 1 is used to carry out treatment for destroying bacteria and plankton when ballast water is taken on and to decompose the bactericide left unremoved in the sea water, thereby carrying out treatment for making the treated sea water harmless when ballast water is discharged.

When ballast water is taken on by a marine vessel, the pump 3 is operated to introduce sea water into the vessel through the sea water intake line 1. Coarse substances are removed from the sea water by the coarse filter 2 and plankton and the like having a size corresponding to the sieve opening of the filter 4 are removed by the filter 4. A bactericide is supplied from the bactericide supply apparatus 5 to the sea water filtered by the filter 4 and the sea water to which the bactericide has been added is introduced into the venturi tube 7. At this time, no bactericide-decomposer is added from the bactericide-decomposer apply apparatus 6. In the venturi tube 7, cavitation is generated to damage aquatic organisms and also the diffusion of the bactericide into the sea water is promoted, leading to increased sterilizing effect.

The treated sea water in the venturi tube 7 is fed to the ballast tank 9 through the treated water feed line 8 and kept therein. In the sea water kept in the ballast tank 9, the bactericide that has been supplied from the bactericide supply apparatus 5 is preferably left at a proper concentration. This can prevent regrowth of bacteria and plankton.

Next, when the ballast water is discharged, the pump 3 is operated to introduce the ballast water from the ballast tank 9 through the ballast water supply line 12. A bactericide-decomposer is supplied from the bactericide-decomposer supply apparatus 6 not through the filter 4 and the bactericide supply apparatus 5 but through a by-path (not shown) to the ballast water which is then introduced into the venturi tube 7. In the venturi tube 7, cavitation is produced to promote the diffusion of the bactericide-decomposer in the sea water, thereby existing bactericide is decomposed in a short time in the venturi tube 7. The ballast water obtained after the bactericide decomposing treatment has been finished is discharged into the sea through the treated water discharge line 13. Since cavitation is produced by the venturi tube 7 to promote the diffusion of the bactericide-decomposer in the sea water, thereby decomposing the bactericide in a short time by the bactericide-decomposer, the bactericide is made harmless without fail while discharging the sea water into the sea from the ballast tank.

Other diffusers such as mixers using a stirring blade to diffuse and mix may be used instead of using the venturi tube 7 which generates cavitation to promote the diffusion of the bactericide-decomposer in the sea water.

Further explanations will be furnished as to the case of using hydrogen peroxide as the bactericide. Hydrogen peroxide is made to remain in an appropriate amount in sea water and the sea water is kept in the ballast tank, thereby making it possible to restrain the regrowth of bacteria and plankton. Also, harmful byproducts are not produced at all.

As the hydrogen peroxide-decomposer, reducing agents sodium sulfite, sodium bisulfite and sodium thiosulfate are supplied.

Using, as the hydrogen peroxide-decomposer, sodium bisulfite, sodium sulfite and sodium thiosulfate respectively, an experiment was made to investigate the time required to decompose hydrogen peroxide. In the case where the concentration of hydrogen peroxide left in sea water was 20 to 100 mg/L, 70 to 350 mg/L of sodium bisulfite, 80 to 400 mg/L of sodium sulfite and 20 to 1000 mg/L of sodium thiosulfate were respectively added and diffused to find the time (required decomposition time) required until the concentration of hydrogen peroxide was 0.1 mg/L or less which was a detection limit. The required decomposition time was within 5 seconds in the case of any of these hydrogen peroxide-decomposers and it was confirmed that hydrogen peroxide can be decomposed in a significantly short time. It is understood from this that hydrogen peroxide is decomposed to make the bactericide harmless without fail while discharging the sea water into the sea from the ballast tank.

It is preferable to measure the concentration of hydrogen peroxide in the sea water introduced from the ballast tank and to supply a reducing agent enough to reduce and to decompose hydrogen peroxide without fail based on the measured value. Also, a hydrogen peroxide densitometer or a redox potentiometer may be disposed in the treated water discharge line 13 on the downstream side of the venturi tube to confirm whether or not hydrogen peroxide is left.

Ballast water is treated using hydrogen peroxide as the bactericide both when it is taken on by the vessel from the sea and when it is discharged into the sea in this manner thereby making it possible to prevent the generation of harmful byproducts and to supply ballast water in which bacteria and plankton in sea water are destroyed. The regrowth of bacteria and plankton in the sea water kept in the ballast tank is suppressed and sea water in which no hydrogen peroxide is left is discharged, to attain treatment having no influence on the ocean.

In the above various embodiments, a bactericide supply amount-control device that controls the amount of the bactericide supplied from the bactericide supply apparatus may be disposed. As one of the bactericide supply amount-control device, there is a type in which the pressure difference of a filter is measured to control the amount of the bactericide to be supplied. Specifically, when the pressure difference is larger than a specified value, this shows that many aquatic organisms exist in the sea water or the filtered water and therefore, the amount of the bactericide to be supplied is increased. When the pressure difference is smaller than a specified value on the contrary, the amount of the bactericide to be supplied is decreased.

Alternatively, when a pressure difference is measured in the filter and reverse washing is carried out automatically in the case where the pressure difference reaches a given value, the amount of the bactericide to be supplied may be adjusted based on the interval of the reverse washing. Specifically, when the interval of the reverse washing is shorter than a given value, this shows that many aquatic microorganisms exist in the sea water and therefore the amount of the bactericide to be supplied is increased. When the interval of the reverse washing is longer than a given value, the amount of the bactericide to be supplied is reduced.

Also, alternatively, a water quality measuring device that measures the turbidity or absorbance of the sea water to be introduced into the filter or water filtered by the filter, and a bactericide supply amount-control device that controls the amount of the bactericide to be supplied based on the measured values of the turbidity or absorbance measured by this water quality measuring device may be provided. Specifically, when the measured values of the turbidity or absorbance measured by this water quality measuring device are larger than each given value, this shows that many aquatic organisms exist in the sea water or the filtered water and therefore, the amount of the bactericide to be supplied is increased. When the measured values of the turbidity or absorbance are smaller than each given value, the amount of the bactericide to be supplied is decreased.

Aquatic organisms can be destroyed without fail and excess supply of the bactericide can be suppressed by adjusting the amount of the bactericide in correspondence to the quantity of aquatic organisms in the sea water or the filtered water.

Moreover, as other apparatuses used to control the amount of the bactericide to be supplied, a bactericide supply amount-control device that measures the redox potential of the sea water to which the bactericide is added to control the amount of the bactericide to be supplied may be installed if the bactericide is sodium hypochlorite. Sodium hypochlorite to be supplied to destroy bacteria is consumed by reducing substances in the sea water. However, sea water taken on by a vessel as ballast water differs in water quality and also differs in the content of reducing substances depending on sea area. Therefore, in order to destroy bacteria satisfactorily, it is necessary to adjust the supply amount of sodium hypochlorite to an amount suited to the water quality. Specifically, the redox potential of the sea water to which sodium hypochlorite is supplied is measured to adjust the concentration of the sodium hypochlorite such that the redox potential is 800 mV or higher with respect to the silver/silver chloride electrode. If the redox potential is made to be 800 mV or higher, the concentration of chlorine left in the sea water is made to be enough to destroy bacteria.

If an apparatus that generates sodium hypochlorite by direct electrodialysis of sea water when sodium hypochlorite is used as the bactericide in the above example, this brings about a reduction in cost.

Also, there is the case where sodium hypochlorite is decomposed at a temperature of 30° C. or higher, bringing about a reduction in its concentration. It is therefore preferable to provide a temperature rise-preventive means that prevents a rise in the temperature of sodium hypochlorite in a vessel reserving sodium hypochlorite. This ensures that the decomposition of sodium hypochlorite can be prevented to limit the consumption of sodium hypochlorite, thereby limiting the cost required to treat ballast water.

Examples of the means for preventing a rise in temperature include a reserving vessel insulating device that insulates the reserving vessel for a sodium hypochlorite solution to prevent a rise in the temperature of sodium hypochlorite in the reserving vessel under way. Also, if the sodium hypochlorite solution is cooled in advance and kept in a reserving vessel provided with the reserving vessel insulating device, the temperature of sodium hypochlorite is exactly controlled and therefore, the decomposition of sodium hypochlorite can be prevented more exactly. Moreover, a reserving vessel may be provided with a cooling exchanger to cool the sodium hypochlorite solution in the reserving vessel. Cooling water may be used as the cooling medium in the cooling exchanger. However, if sea water is used as the cooling medium, an operation cost for cooling can be suppressed.

Also, when sodium hypochlorite is used as the bactericide in the same manner as above, the concentration of sodium hypochlorite reduced by the decomposition can be recovered if an electrolyzer that electrolyzes sodium chlorite produced by the decomposition of sea water or sodium hypochlorite to produce or regenerate sodium hypochlorite.

Moreover, when sodium hypochlorite is used as the bactericide in the same manner as above, an acid supply step is provided prior to the bactericide supply step to adjust the sea water to pH 5 to 7 before the bactericide is supplied, thereby enabling an increase in the effect of destroying bacteria. If an acid is supplied to the sea water before the bactericide is supplied to adjust the sea water to pH 5 to 7, the form of free residual chlorine in the sea water after the bactericide is supplied is almost occupied by hypochlorous acid (HOCl), which improves sterilizing effect. Therefore, the sea water is preferably adjusted to pH 5 to 7. If the pH of the sea water is less than 5, the form of free residual chlorine is hypochlorous acid and $Cl_2$. If the pH exceeds 7, the form of free residual chlorine is hypochlorous acid and hypochlorous acid ion (OCl⁻). In any of these vases, the ratio of hypochlorous acid (HOCL: having a sterilizing effect 100 times that of other) is low and therefore, the sterilizing effect is reduced. As the acid to be supplied, hydrochloric acid or sulfuric acid is used.

After the treatment using the bactericide, an alkali agent such as sodium hydroxide is added in the ballast water, to thereby prevent disorders from arising even if the ballast water is discharged into the surrounding sea area. As the alkali agent, sodium sulfite is preferably used. This is because sodium sulfite has the ability of decomposing residual chlorine.

Though sodium hyposulfite is used as the bactericide in the above example, peracetic acid may be used. In this case, peracetic acid kept at a temperature of 10° C. or lower to prevent itself from being decomposed. As the bactericide-decomposer, sodium thiosulfate or sodium sulfite is preferably used.

In the above example, the bactericide supply apparatus is used for sterilization. However, a ultraviolet radiation apparatus may be used in place of the bactericide supply apparatus. The ultraviolet radiation apparatus has a structure in which a ultraviolet lamp is installed in a pipe through which sea water is passed or a container in which sea water is kept to irradiate the sea water with ultraviolet light at an intensity and for a time necessary to destroy bacteria. When the ultraviolet radiation apparatus is used, no bactericide is used and it is not necessary to decompose any bactericide by using a bactericide-decomposer and there is also no fear that harmful substances are by-produced by a bactericide.

Embodiment 2

FIG. 2 is an explanatory view according to a second embodiment of the present invention. The same symbols are attached to the same parts as those of Embodiment 1. This embodiment differs from Embodiment 1 in the point that sea water is retained after a chlorine bactericide is supplied to the sea water, treatment using hydrogen peroxide is carried out and a second venturi tube is used. Specifically, sea water filtered by a filter is introduced into a first venturi tube after a chlorine bacteria is supplied thereto. The chlorine bactericide is diffused in the sea water by cavitation produced in the venturi tube, leading to an increase in sterilizing effect. Then, the sea water is retained in a holding tank for a prescribed time and then hydrogen peroxide is supplied to the sea water, which is then introduced into a second venturi tube. Hydrogen peroxide is diffused in the sea water by cavitation produced in the second venturi tube.

In this embodiment, after a chlorine bactericide is supplied to sea water, the sea water is introduced into the holding tank to hold the sea water in the holding tank for the time only required to destroy bacteria by available chlorine, thereby carrying out sterilizing treatment. Hydrogen peroxide is supplied to the sea water discharged from the holding tank to reduce residual chlorine, thereby making chlorine lose its effect to thereby limit the generation of trihalomethanes and further to destroy plankton that is incompletely destroyed but remains by hydrogen peroxide. The sea water that is treated to destroy not only bacteria but also plankton is fed to the ballast tank in this manner. In other words, after the chlorine bactericide is supplied to sea water, the sea water in which available chlorine is made to exist is retained in the holding tank for the time which is sufficient to destroy bacteria and be within the time during which the generation of trihalomethanes can be prevented. Then, hydrogen peroxide is supplied to reduce residual chlorine, to thereby make chlorine lose its effect, thereby suppressing the generation of trihalomethanes.

The apparatus for treating ballast water according to this embodiment is, as shown in FIG. 2, provided with the following structure. A sea water intake line 1 introduces sea water into a vessel. A coarse filter 2 removes coarse substances in the sea water introduced from the sea water intake line 1. A pump 3 introduces sea water or feeds ballast water in a ballast tank 9 (which will be explained later) to a filter 4. The filter 4 removes plankton existing in the sea water from which coarse substances are removed by the coarse filter 2. A bactericide supply apparatus 5A supplies chlorine bactericide to the sea water filtered by the filter 4 to destroy bacteria. A first venturi tube 7A introduces the sea water (filtered water) to which the chlorine bactericide has been added, and generates cavitation in the sea water to damage or destroy bacteria and plankton and also to diffuse the chlorine bactericide. A holding tank 14 holds the sea water discharged from the first venturi tube 7A for a prescribed time. A hydrogen peroxide supply apparatus 15 supplies hydrogen peroxide to the sea water fed from the holding tank 14. A hydrogen peroxide-decomposer supply apparatus 6A supplies hydrogen peroxide-decomposer to the sea water to which hydrogen peroxide has been added. The sea water to which hydrogen peroxide and the hydrogen peroxide-decomposer have been added is supplied to a second venturi tube 7B. The hydrogen peroxide and the hydrogen peroxide-decomposer are diffused in the sea water by the second venturi tube 7B. A treated water feedpipe 8 feeds the treated sea water to which hydrogen peroxide and the hydrogen peroxide-decomposer have been added to, a ballast tank 9 (which will be explained later). The ballast tank 9 holds the treated sea water fed from the treated water feed line 8. A water discharge line 10 discharges the treated ballast water in the ballast tank 9 into the sea. An untreated water feed line 11 feeds untreated sea water into the ballast tank 9. A ballast water supply line 12 feeds untreated ballast water in the ballast tank 9 to the filter 4 side. A treated water discharge line 13 discharges the ballast water obtained after the untreated ballast water is treated into the sea.

Each apparatus will be explained in more detail. Here, the coarse filter and the filter are the same as in Embodiment 1, explanations of these parts are omitted.

<Chlorine Bactericide Supply Apparatus>

The bactericide supply apparatus 5A serves to supply a chlorine bactericide to sea water which is filtered by the filter 4 and introduced into the venturi tube 7A to destroy bacteria. As the chlorine bactericide, sodium hypochlorite, calcium hypochlorite or chlorine gas can be used.

Chlorine bactericide is preferably supplied such that the amount by weight of available chlorine in sea water is 0.1 to 100 mg/L. This reason is that if the concentration by weight of available chlorine is less than 0.1 mg/L when the chlorine bactericide is supplied, available chlorine is consumed because it reacts with reducing substances or organic materials in water and therefore bacteria and plankton cannot be destroyed, whereas if the concentration by weight of available chlorine is more than 100 mg/L, there are the problem concerning corrosion and the problem that the consumption of the chlorine bactericide and the size of a reserving vessel of sodium hypochlorite are increased, causing high costs. The chlorine bacteria is introduced into the upstream side of the first venturi tube 7A and/or the first venturi tube 7A.

<First Venturi Tube>

The filtered water is introduced into the first venturi tube 7A where the chlorine bacteria is dispersed in the filtered water. The first venturi tube 7A diffuses the chlorine bactericide in the sea water and also damages or destroys bacteria and plankton that have passed through the filter 4 by cavitation. Here, the structure and action of the first venturi tube 7A are the same as those in the first embodiment and explanations of the first venturi tube 7A are therefore omitted.

The chlorine bactericide is supplied to the upstream side of the first venturi tube 7A and/or the throat part of the first venturi tube 7A. The following points are given as the advantage obtained by supplying the chlorine bactericide to the upstream side of the venturi tube 7A. When the chlorine bactericide is supplied to the upstream side of the venturi tube 7A, the chlorine bactericide can be diffused to some extent in the sea water in the passage by the time when the chlorine bactericide reaches the throat part of the first venturi tube 7A where cavitation is produced. Then, when the chlorine bactericide diffused to some extent reaches the throat part of the first venturi tube 7A, the diffusion and mixing of the chlorine bactericide can be further accelerated by cavitation. For this reason, the penetration of the chlorine bactericide into bacteria can be more promoted and the effect of the chlorine bactericide can be further increased. In order to supply the chlorine bactericide to the upstream side of the venturi tube 7A, an injection port used to introduce the chlorine bactericide is disposed in the passage upstream of the first venturi tube 7A. When the chlorine bactericide is supplied to the throat part of the first venturi tube 7A, it is automatically sucked by the ejector action of the venturi tube 7A, and therefore, a supply pump used to supply the chlorine bactericide is unnecessary.

In the above example, the venturi tube is used as one that serves to diffuse the chlorine bactericide rapidly in sea water. However, a static mixer or a stirrer that rotates a stirring blade which produces a stirring flow in the sea water passage may be used as one having a diffusing function other than the venturi tube.

<Holding Tank>

The holding tank 14 retains the sea water to which the chlorine bactericide is added and diffused, to bring available chlorine generated from the chlorine bactericide into contact with bacteria for a prescribed time. This fixed time means one which is sufficient to destroy bacteria and within the time during which the generation of trihalomethanes can be prevented. The upper limit of the holding time is preferably designed to be 10 min., from the viewpoint of suppressing the generation of trihalomethanes. Also, it is reasonable to think that the time required to bring bacteria into contact with residual available chlorine to destroy bacteria is significantly shortened if the residual chlorine concentration is increased. However, 0.05 min. is preferably the lower limit in view of disposing the holding tank during the course of feeding a large amount of sea water to the ballast tank and operational convenience in setting the holding time.

If the contact time between the sea water and the residual available chlorine, that is, the holding time is set to 0.05 to 10 min., the generation of trihalomethanes can be suppressed and also bacteria can be destroyed by properly adjusting the concentration of the residual available chlorine in the range of 0.1 to 100 mg/L depending on the sea water which is a treatment subject. Therefore, the holding tank is disposed which ensures that the time taken from when the chlorine bactericide is supplied until hydrogen peroxide is supplied (that is, the holding time) is 0.05 to 10 min., such that the contact time is 0.05 to 10 min., whereby bacteria can be destroyed down to the treatment standard.

The dimension and shape of the holding tank 14 are defined and the sea water is made to flow at a specified flow rate in order to retain the sea water for a prescribed time from when the chlorine bactericide is supplied until hydrogen peroxide is supplied. For example, plural partitions are provided in the tank to thereby form a long passage, thereby securing the holding time in the tank. Alternatively, such a structure may be adopted in which the holding tank 14 is constituted of a simple reservoir and a discharge gate is opened or a discharge pump is operated such that the sea water is discharge when the sea water is kept for the prescribed time. Also, the pipe through which sea water is fed may be so designed that it is used as a holding tank. Also, the holding tank 14 may be formed by remodeling a part of the ballast tank 9. If a part of the ballast tank 9 is used as the holding tank 14, it is unnecessary to newly install the holding tank 14, making easy to apply this system to the existing marine vessels, whereby the installation cost can be reduced.

<Hydrogen Peroxide Supply Apparatus>

A hydrogen peroxide supply apparatus 15 supplies hydrogen peroxide to the sea water which is added with the chlorine bactericide and retained in the holding tank 14 for a prescribed time, to reduce available chlorine left in the sea water to make available chlorine lose its effect, thereby limiting the generation of trihalomethanes. In order to diffuse hydrogen peroxide in the sea water, it is preferable to dispose a second venturi tube 7B in the passage through which the sea water is discharged from the holding tank 14 and to dispose a hydrogen peroxide supply apparatus 15 on the upstream side of the second venturi tube 7B. In this case, aqueous hydrogen peroxide is used as the above hydrogen peroxide to be supplied.

<Hydrogen Peroxide-Decomposer Supply Apparatus>

The hydrogen peroxide-decomposer supply apparatus 6A supplies hydrogen peroxide-decomposer to the sea water to which hydrogen peroxide is supplied from the hydrogen peroxide supply apparatus 15. If the hydrogen peroxide-decomposer is supplied to the sea water to which hydrogen peroxide has been added, hydrogen peroxide left in the sea water is decomposed, thereby limiting the influence of the discharge on the ocean. As the hydrogen peroxide-decomposer, enzymes or reducing agents which reduce and decompose hydrogen peroxide, for example, enzymes such as catalase, sodium sulfite, sodium bisulfite and sodium thiosulfate may be used.

<Second Venturi Tube>

The sea water to which hydrogen peroxide and the hydrogen peroxide-decomposer are added is introduced into the second venturi tube 7B. The second venturi tube 7B diffuses hydrogen peroxide and the hydrogen peroxide-decomposer in the sea water. The provision of the second venturi tube 7B is preferable because the second venturi tube 7B has a large diffusing effect and also the effect of destroying plankton by cavitation. An injection port that introduces hydrogen peroxide and an injection port that introduces the hydrogen peroxide-decomposer may be disposed in the passage for discharging the sea water from the holding tank 14 instead of disposing the second venturi tube 7B.

Next, with regard to the apparatus for treating ballast water which is constituted in the above manner, explanations will be furnished as to the case of treating sea water by using a bactericide when sea water is taken into the ballast tank 9.

When the pump 3 is operated, sea water is taken on by the vessel from the sea water intake line 1. At this time, coarse substances about 10 mm or larger in size among various large or small foreign materials and aquatic organisms existing in sea water are removed by the coarse filter 2. The sea water from which coarse substances have been removed is introduced into the filter 4 to remove zooplankton, phytoplankton and the like having a size corresponding to the sieve opening of the filter 4. Aquatic organisms and the like trapped by the filters 2 and 4 are returned to the sea by subjecting filters including the filters 2 and 4 to reverse washing. Even if these filter residues are returned to the sea, they have no influence on the biosystem because they are returned to the same sea area. In other words, because, in this example, the ballast water is treated when it is taken on by the vessel, the water used for the reverse washing in the filters 2 and 4 may be discharged as it is.

A bactericide is supplied to the sea water filtered by the filter 4 from the bactericide supply apparatus 5A on, for example, the upstream side of the first venturi tube 7A and the sea water to which the chlorine bactericide is added is introduced into the venturi tube 7A. In the venturi tube 7A, cavitation is produced by the mechanism mentioned above, which promotes the diffusion of the chlorine bactericide in the sea water, leading to increased sterilizing effect. Moreover, by the cavitation, impact pressure, shearing force, high temperature and the action of OH radicals having strong oxidation ability are acted on aquatic organisms in the sea water, with the result that these aquatic organisms are damaged and destroyed.

The sea water in which the chlorine bactericide is diffused by the first venturi tube 7A is fed to the ballast tank 14 and retained there for a prescribed time, where available chlorine generated from the chlorine bactericide sterilizes the sea water to destroy bacteria. The time required to retain the sea water in the holding tank 14 is in the range of 0.05 to 10 min., in order to sufficiently destroy bacteria during holding and to limit the amount of trihalomethanes generated by residual chlorine to the lowest level.

Hydrogen peroxide is supplied to the sea water discharged from the holding tank 14 after the sea water is retained in the holding tank 14 for the prescribed time, to make residual chlorine lose its effect, thereby suppressing the generation of trihalomethanes and also destroying living plankton. In addition, the cavitation of the second venturi tube 7B is made to act on plankton to destroy or damage plankton, thereby promoting the penetration of hydrogen peroxide into plankton to increase the effect of hydrogen peroxide. Also, a hydrogen peroxide-decomposer is supplied from the hydrogen peroxide-decomposer supply apparatus 6A to the sea water to which hydrogen peroxide has been added, to decompose hydrogen peroxide left unremoved in the sea water, thereby minimizing the influence of the discharged sea water when this sea water is discharged into the ocean. Thereafter, the sea water is kept in the ballast tank 9 through the treated water feed pipe 8 and discharged into the sea through the water discharge line 10 when the ballast water is discharged.

In the above embodiment, as mentioned above, zooplankton and phytoplankton 10 to 200 μm or larger in size are removed by the filter 4, and the chlorine bactericide is supplied to the sea water, which is then retained for a prescribed time to thereby destroy bacteria. Moreover, residual chlorine is reduced to lose its effect and also, plankton living even after is being treated with the chlorine bactericide is destroyed by supplying hydrogen peroxide. As a result, the treatment used to obtain ballast water that exactly meets the IMO ballast water treatment standard can be attained and also, the generation of trihalomethanes produced from residual chlorine can be suppressed.

Also, a chlorine bactericide and hydrogen peroxide are sufficiently diffused in sea water and therefore the effect of destroying bacteria and plankton is increased by introducing sea water to which the chlorine bactericide and hydrogen peroxide have been supplied into the venturi tube. Moreover, since the cavitation of the venturi tube damages plankton, the penetration of the chlorine bactericide and hydrogen peroxide is promoted so that their effects are improved. It is therefore possible to destroy bacteria and plankton having strong resistance to the chlorine bactericide and hydrogen peroxide. Also, the amounts of the chlorine bactericide and hydrogen peroxide to be added can be further reduced than in the case of using each of these compounds singly.

Though the chlorine bactericide is supplied to the upstream side of the venturi tube 7 and/or the throat part of the venturi tube 7 in the above example, it may be further supplied to the downstream side of the venturi tube 7. In the case of supplying the chlorine bactericide to the downstream side of the venturi tube, the following effect is obtained. Specifically, bacteria and the like stuck to plankton are separated by the cavitation, and therefore, the chlorine bactericide is made to act on these separated bacteria at the downstream side of the venturi tube 7, thereby making it possible to increase the sterilizing effect. Also, the chlorine bactericide is made to penetrate into the body of plankton living but damaged in its coat by the cavitation to increase the sterilizing effect. For this reason, plankton having strong resistance to the chlorine bactericide can be destroyed and the amount of the chlorine bactericide can be more decreased than in the case of treatment using the chlorine bactericide singly. Also, when hydrogen peroxide is supplied, the same effect is also supplied by supplying it to the downstream side of the venturi tube.

In the above example, it is assumed that the treatment using a chlorine bactericide is carried out when sea water is taken into the ballast tank. However, the treatment may be carried out either when sea water is taken on by a vessel or when sea water is discharged or at both times. The time at which the treatment using the chlorine bactericide is carried out can be determined according to the amount of microorganisms living in the sea area concerned and the navigation condition of a marine vessel.

The treatment using a chlorine bactericide can be carried out not when sea water is taken into the ballast tank 9 but when sea water is discharged from the ballast tank 9. In this case, untreated sea water is fed to the ballast tank 9 through the untreated sea water feed line 11 when the sea water is taken on. When this ballast water is discharged from the ballast tank 9, a discharge pump is operated and ballast water (untreated) kept in the ballast tank 9 is supplied to the filter 4 through the ballast water supply line 12 and thereafter treated in the same manner as above. The treated ballast water is discharged into the sea through the treated water discharge line 13. In this case, it is unnecessary to leave hydrogen peroxide such that the ballast water in the ballast tank keeps the treatment standard. Therefore, hydrogen peroxide may be supplied in an amount only enough to reduce residual chlorine and to destroy plankton.

Also, the treatment using the chlorine bactericide may be carried out both when sea water is taken into the ballast tank and when sea water is discharged from the ballast tank. In this case, the treatment may be lightly carried out when the ballast water is discharged.

Embodiment 3

Figure 3:
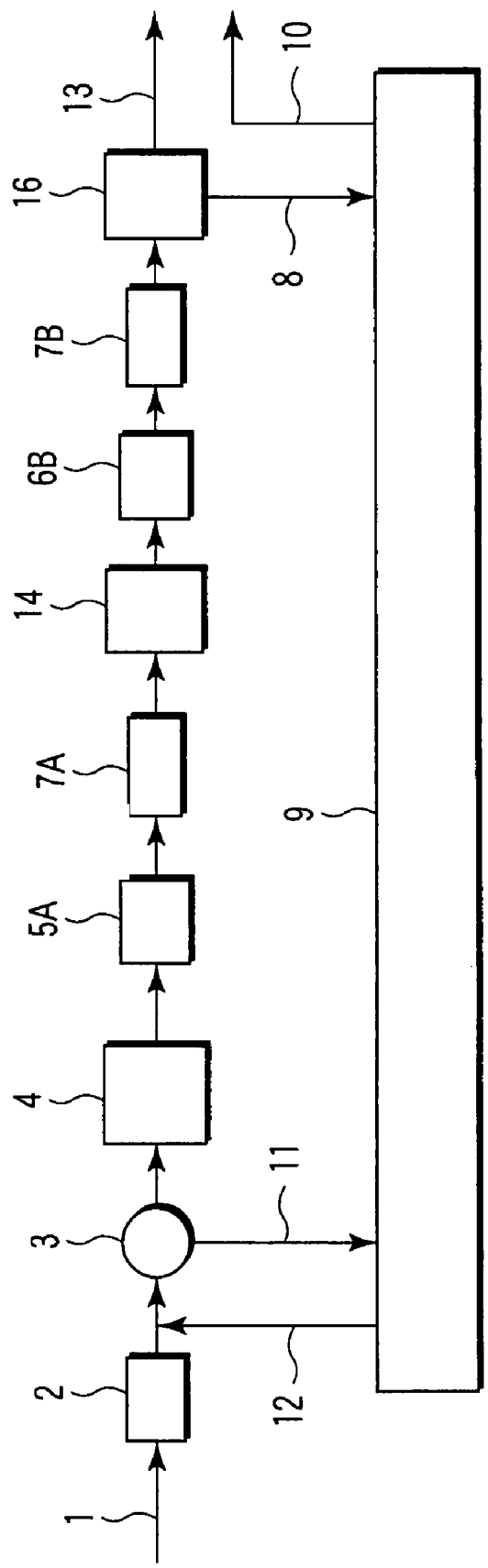
FIG. 3 is a block diagram of an apparatus for treating ballast water according to a further embodiment of the present invention.
Figure 4:
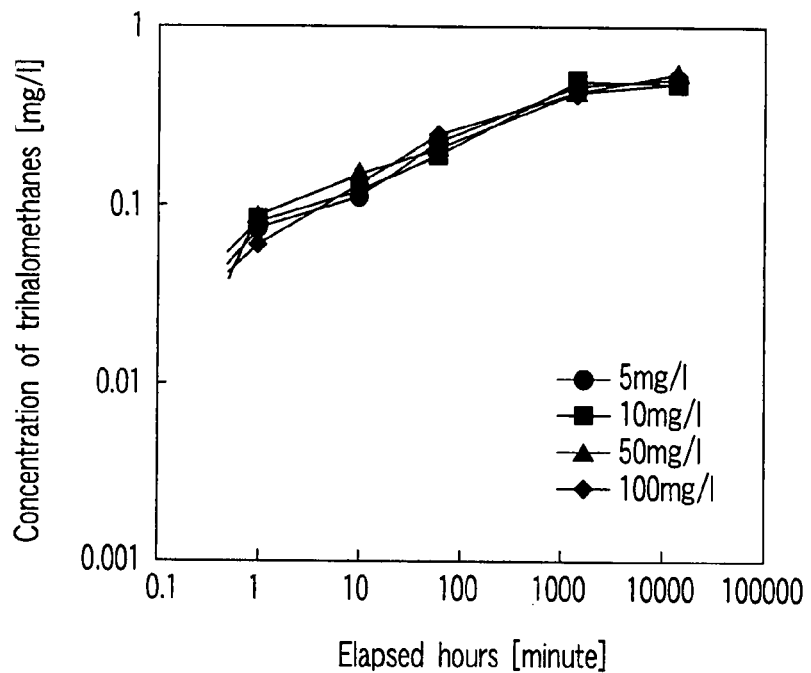
FIG. 4 is a graph showing a variation in the concentration of trihalomethanes in sea water after a chlorine bacteria is injected.
Figure 5:
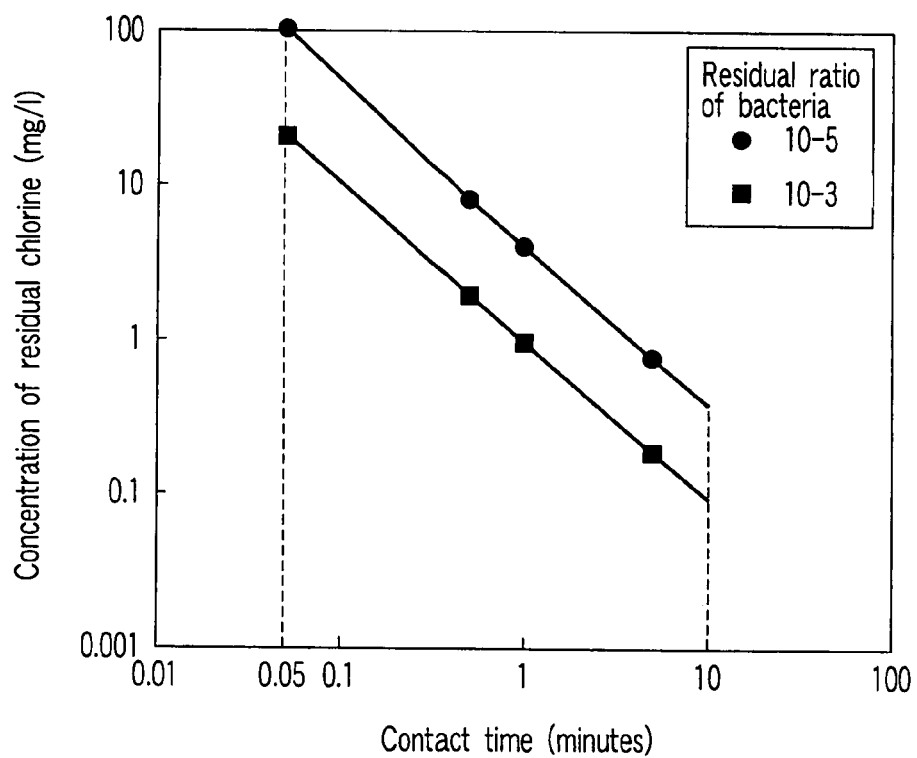
FIG. 5 is a graph showing the relation between the concentration of residual chlorine in sea water and the contact time between bacteria in sea water and available chlorine, which contact time is required for the sea water to meet the IMO ballast water treatment standard.
Figure 6:
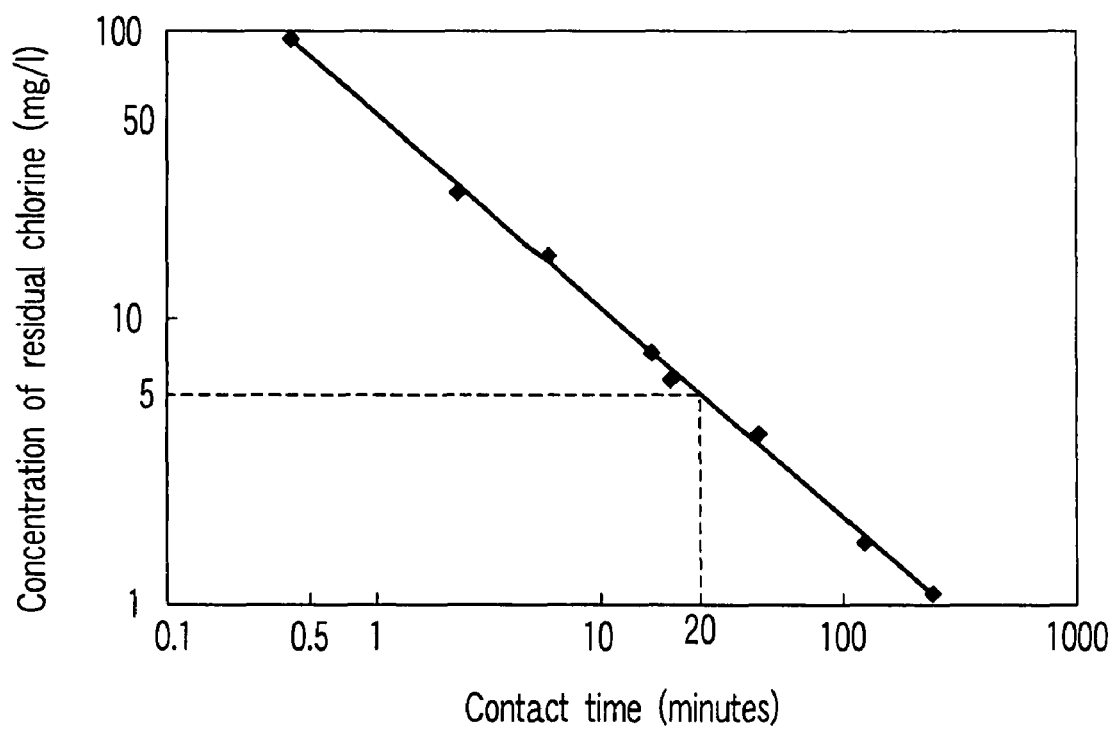
FIG. 6 is a graph showing the relation between the concentration of residual chlorine in sea water and the contact time between bacteria and plankton in sea water and available chlorine, which contact time is required for the sea water to meet the IMO ballast water treatment standard.

FIG. 3 is an explanatory view according to a third embodiment of the present invention. The same symbols are attached to the same parts as those of Embodiment 1. This embodiment differs from Embodiment 1 in the point that sea water is retained after a chlorine bactericide is supplied to the sea water, a chlorine reducing agent is supplied, a second venturi tube is used and activated carbon treatment is carried out. Specifically, sea water filtered by a filter is introduced into a first venturi tube after a chlorine bacteria is supplied thereto. The chlorine bactericide is diffused in the sea water by cavitation produced in the first venturi tube. Then, the sea water is retained in the holding tank for the prescribed time and then, a chlorine reducing agent is supplied to the sea water, which is then introduced into a second venturi tube. The chlorine reducing agent is diffused in the sea water by cavitation produced in the second venturi tube. The sea water discharged from the second venturi tube is further subjected to activated carbon treatment.

In this embodiment, after a chlorine bactericide is supplied to sea water, the sea water is introduced into the holding tank to hold the sea water in the holding tank for the time only required to destroy bacteria and plankton by available chlorine, thereby carrying out sterilizing treatment. A chlorine reducing agent is supplied to the sea water discharged from the holding tank to reduce residual chlorine, thereby making residual chlorine lose its effect to thereby limit the generation of trihalomethanes. Then, residual chlorine in the sea water is reduced by activated carbon in an activated carbon treatment apparatus to suppress the generation of trihalomethanes and trihalomethanes produced in the holding tank are stuck to the activated carbon and removed. The sea water in which bacteria and plankton are destroyed and the generation of trihalomethanes is suppressed is fed to the ballast tank.

The apparatus for treating ballast water of this embodiment is, as shown in FIG. 3, provided with the following structure. A sea water intake line 1 introduces sea water into a vessel. A coarse filter 2 removes coarse substances in the sea water introduced from the sea water intake line 1. A pump 3 introduces sea water or feeds ballast water in a ballast tank 9 (which will be explained later) to a filter 4. The filter 4 removes plankton existing in the sea water from which coarse substances are removed by the coarse filter 2. A chlorine bactericide supply apparatus 5A supplies chlorine bactericide to the sea water filtered by the filter 4 to destroy bacteria. A first venturi tube 7A introduces the sea water (filtered water) to which the chlorine bactericide has been added and generates cavitation in the sea water to destroy bacteria and plankton and also to diffuse the chlorine bactericide. A holding tank 14 holds the sea water to which the chlorine bactericide has been added for a prescribed time. A chlorine reducing agent supply apparatus 6B supplies chlorine reducing agent to the sea water fed from the holding tank 14. A second venturi tube 7B introduces the sea water to which the chlorine reducing agent is added, to generate cavitation, thereby diffusing the chlorine reducing agent in the sea water. An activated carbon treatment apparatus 16 introduces the treated sea water to which the chlorine reducing agent has been added, to carry out activated carbon treatment. A treated water feedpipe 8 feeds the sea water which has been treated with activated carbon to the ballast tank 9 (which will be explained later). The ballast tank 9 keeps the treated sea water fed from a treated water feedpipe 8. A water discharge line 10 discharges the ballast water kept in the ballast tank 9 into the sea. An untreated sea water feed line 11 feeds untreated sea water to the ballast tank 9. A ballast water supply line 12 feeds the untreated ballast water in the ballast tank 9 to the filter 4 side. A treated water discharge line 13 discharges the ballast water obtained after the untreated ballast water is treated into the sea.

Each apparatus will be explained in more detail. Here, the coarse filter and the filter are the same as in Embodiment 1, explanations of these parts are omitted.

<Chlorine Bactericide Supply Apparatus>

The chlorine bactericide supply apparatus 5A serves to supply a chlorine bactericide to sea water before the sea water is introduced into the venturi tube 7A to destroy bacteria and plankton. As the chlorine bactericide, sodium hypochlorite, calcium hypochlorite or chlorine gas may be used.

Chlorine bactericide is preferably supplied such that the amount by weight of available chlorine in sea water is 5 to 100 mg/L. This reason is that if the concentration by weight of available chlorine is less than 5 mg/L when the chlorine bactericide is supplied, available chlorine is consumed because it reacts with reducing substances or organic material in water and therefore bacteria and plankton cannot be destroyed, whereas if the concentration by weight of available chlorine is more than 100 mg/L, there are the problem that the amount of trihalomethanes to be produced is increased, the problem concerning corrosion and the problem that the cost of the chlorine bactericide and the size of a reserving vessel of sodium hypochlorite are increased, causing high costs. The chlorine bactericide is introduced into the upstream side of the first venturi tube 7A and/or the first venturi tube 7A.

<First Venturi Tube>

The filtered water to which the chlorine bactericide is added is introduced into the first venturi tube 7A where the chlorine bacteria is diffused in the filtered water. The first venturi tube 7A diffuses the chlorine bactericide in the sea water and also damages or destroys plankton that have passed through the filter 4 by cavitation. Here, the structure and action of the first venturi tube 7A are the same as those in the first embodiment and explanations of the first venturi tube 7A are therefore omitted.

The chlorine bactericide is supplied to the upstream side of the first venturi tube 7A and/or the throat part of the first venturi tube 7A. The following points are given as the advantage obtained by supplying the chlorine bactericide to the upstream side of the first venturi tube 7A. When the chlorine bactericide is supplied to the upstream side of the first venturi tube 7A, the chlorine bactericide can be diffused to some extent in the sea water in the passage by the time when the chlorine bactericide reaches the throat part of the first venturi tube 7A where cavitation is produced. Then, when the chlorine bactericide diffused to some extent reaches the throat part of the first venturi tube 7A, the diffusion and mixing of the chlorine bactericide can be further accelerated by cavitation. For this reason, the penetration of the chlorine bactericide into bacteria can be more promoted and the effect of the chlorine bactericide can be further increased. In order to supply the chlorine bactericide to the upstream side of the venturi tube 7A, an injection port used to introduce the chlorine bactericide is disposed in the passage upstream of the first venturi tube 7A. When the chlorine bactericide is supplied to the throat part of the first venturi tube 7A, it is automatically sucked by the ejector action of the venturi tube 7A, and therefore, a supply pump used to supply the chlorine bactericide is unnecessary.

In the above example, the venturi tube is used as one that serves to diffuse the chlorine bactericide rapidly in sea water. However, a static mixer or a stirrer that rotates a stirring blade which produces a stirring flow in the sea water passage may be used as one having a diffusing function other than the venturi tube.

<Holding Tank>

The holding tank 14 retains the sea water to which the chlorine bactericide has been added and diffused, to bring available chlorine generated from the chlorine bactericide into contact with bacteria and plankton for a prescribed time. This fixed time means one which is sufficient to destroy bacteria and within the time during which the generation of trihalomethanes can be prevented. The upper limit of the holding time is preferably designed to be 20 min., from the viewpoint of suppressing the generation of trihalomethanes. Also, it is reasonable to think that the time required to bring bacteria into contact with residual available chlorine to destroy bacteria is significantly shortened if the residual chlorine concentration is increased. However, 0.5 min. is preferably the lower limit in view of disposing holding tank during the course of feeding a large amount of sea water to the ballast tank and operational convenience in setting the holding time.

If the contact time between the sea water and the residual available chlorine, that is, the holding time is set to 0.5 to 20 min., the generation of trihalomethanes can be suppressed and also bacteria can be destroyed by properly adjusting the concentration of the residual available chlorine of the chlorine bactericide in the range of 5 to 100 mg/L depending on the sea water which is a treatment subject. Therefore, the holding tank is disposed which ensures that the time taken from when the chlorine bactericide is supplied until chlorine reducing agent is supplied (that is, the holding time) is 0.5 to 20 min., such that the contact time is 0.5 to 20 min., whereby bacteria can be destroyed down to the treatment standard.

The dimension and shape of the holding tank 14 are defined and the sea water is made to flow at a specified flow rate in order to retain the sea water for a prescribed time from when the chlorine bactericide is supplied until the chlorine reducing agent is supplied. For example, plural partitions may be provided in the tank to thereby form a long passage, thereby securing the holding time in the tank. Alternatively, such a structure may be adopted in which the holding tank 14 is constituted of a simple reservoir and a discharge gate is opened or a discharge pump is operated such that the sea water is discharged when the sea water is kept for the prescribed time. Also, the pipe through which sea water is fed may be so designed that it is used as a holding tank. Also, the holding tank 14 may be formed by remodeling a part of the ballast tank 9. If a part of the ballast tank 9 is used as the holding tank 14, it is unnecessary to newly install the holding tank 14, making easy to apply this system to the existing marine vessels, whereby the installation cost can be reduced.

<Chlorine Reducing Agent Supply Apparatus>

A chlorine reducing agent supply apparatus 6B supplies chlorine reducing agent to the sea water which is added with the chlorine bactericide and retained in the holding tank 14 for a prescribed time, to reduce available chlorine left in the sea water to make available chlorine lose its effect, thereby limiting the generation of trihalomethanes. In order to diffuse the chlorine reducing agent in the sea water, it is preferable to dispose a second venturi tube 7B in the passage through which the sea water is discharged from the holding tank 14 and a chlorine reducing agent supply apparatus 6B on the upstream side of the second venturi 7B as shown in FIG. 3. In this case, it is preferable to use sodium thiosulfate, sodium sulfite and or sodium bisulfite as the chlorine reducing agent to be supplied from the viewpoint of costs and handling easiness. Aqueous hydrogen peroxide may be used as the above chlorine reducing agent.

<Second Venturi Tube>

The sea water to which the chlorine reducing agent has been added is introduced into the second venturi tube 7B. The second venturi tube 7B promotes the effect of diffusing the chlorine reducing agent in the sea water and also the effect of reducing available chlorine left untreated by the chlorine reducing agent to make available chlorine lose its effect. As a result, the generation of trihalomethanes is suppressed. The use of the second venturi tube 7B is preferable because this improves diffusing effect and also produces the effect of destroying plankton by cavitation. An injection port of introducing the chlorine reducing agent may be disposed in a passage through which the sea water is discharged from the holding tank 14 instead of disposing the second venturi 7B.

<Activated Carbon Treatment Apparatus>

An activated carbon treatment apparatus 16 reduces residual chlorine in the sea water by activated carbon to suppress the generation of trihalomethanes and also make activated carbon adsorb trihalomethanes produced in the holding tank 7 to remove these trihalomethanes. The sea water treated by the activated carbon treatment apparatus 16 is kept in the ballast tank 9. The effect of residual chlorine can be eliminated without fail by combining the treatment using activated carbon with the treatment using the chlorine reducing agent. Also, the combination of these treatments enables, for examples, the activated carbon treatment apparatus 16 to be made smaller and a reduction in the amount of activated carbon to be used.

As the activated carbon treatment apparatus 16, an apparatus in which activated carbon is fluidized gently in a container (by adjusting the shape and size of the activated carbon or by adjusting the flow rate of the sea water) or an apparatus which is packed with activated carbon can be used. If granular activated carbon is used, activated carbon can be gently fluidized with ease and can be also exchanged simply. Also, the activated carbon treatment apparatus 16 may be provided by remodeling a part of the ballast tank 9. If a part of the ballast tank 9 is used as the activated carbon treatment apparatus 16, it is unnecessary to install the activated carbon treatment apparatus 16 newly. This makes it easy to remodel existing marine vessels and possible to decrease installation costs.

Next, with regard to the apparatus for treating ballast water which is constituted in the above manner, explanations will be furnished as to the case of treating sea water by using a bactericide when sea water is taken into the ballast tank 9.

When the pump 3 is operated, sea water is taken on by the vessel from the sea water intake line 1. At this time, coarse substances about 10 mm or larger in size among various large or small foreign materials and aquatic organisms existing in sea water are removed by the coarse filter 2. The sea water from which coarse substances are removed is introduced into the filter 4 to remove zooplankton, phytoplankton and the like having a size corresponding to the sieve opening of the filter 4. Aquatic organisms and the like trapped by the filters 2 and 4 are returned to the sea by subjecting filters including the filters 2 and 4 to reverse washing. Even if these aquatic organisms trapped by the filter 4 are returned to the sea, they have no influence on the biosystem because they are returned to the same sea area. In other words, because, in this example, the ballast water is treated when it is taken on by the vessel, the water used for the reverse washing in the filters 2 and 4 can be discharged as it is.

A bactericide is supplied to the sea water filtered by the filter 4 from the bactericide supply apparatus 5A at, for example, the upstream side of the first venturi tube 7A and the sea water to which the chlorine bactericide has been added is introduced into the venturi tube 7A. In the venturi tube 7A, cavitation is produced by the mechanism mentioned above, which promotes the diffusion of the chlorine bactericide in the sea water, leading to increased sterilizing effect. Moreover, by the cavitation, impact pressure, shearing force, high temperature and OH radicals having strong oxidation ability are acted on aquatic organisms in the sea water, with the result that these aquatic organisms are damaged and destroyed.

The sea water in which the chlorine bactericide is diffused by the first venturi tube 7A is introduced into the ballast tank 14 and retained there for a prescribed time, where available chlorine generated from the chlorine bactericide sterilizes the sea water to destroy bacteria. The time required to retain the sea water in the holding tank 14 is in the range of 0.5 to 20 min., in order to sufficiently destroy bacteria during holding and to limit the amount of trihalomethanes generated by residual chlorine as small as possible.

A chlorine reducing agent is supplied to the sea water discharged from the holding tank 14 after the sea water is retained in the holding tank 14 for a prescribed time, and diffused in the sea water by the cavitation of the second venturi tube 7B to reduce residual chlorine, thereby suppressing the generation of trihalomethanes. In addition, plankton is also destroyed by the cavitation of the second venturi tube 7B. Then, the sea water to which the chlorine reducing agent has been added is introduced into the activated carbon treatment apparatus 16 to reduce residual chlorine, thereby suppressing the generation of trihalomethanes and also making activated carbon adsorb trihalomethanes generated in the holding tank 14 to remove them. Then, the sea water is kept in the ballast tank 9 through the treated water feedpipe 8 and discharged into the sea through the water discharge line 10 when the ballast water is discharged.

In the above embodiment, as mentioned above, zooplankton and phytoplankton 10 to 200 μm or larger in size are removed by the filter 4 and the chlorine bactericide is supplied to the sea water, which is then retained for a prescribed time to thereby destroy bacteria and plankton. Then, the chlorine reducing agent is supplied to reduce residual chlorine to make residual chlorine lose its effect, thereby suppressing the generation of trihalomethanes generated from residual chlorine. Moreover, residual chlorine is reduced by activated carbon to suppress the generation of trihalomethanes and also, trihalomethanes generated in the holding tank 14 are adsorbed by activated carbon and removed. As a result, the treatment used to obtain ballast water that exactly meets the IMO ballast water treatment standard can be attained and also, the generation of trihalomethanes produced from residual chlorine can be suppressed.

Also, a chlorine bactericide is sufficiently diffused in sea water and therefore the effect of sterilizing bacteria and plankton is increased by introducing sea water to which the chlorine bactericide has been supplied into the venturi tube. Moreover, since the cavitation of the venturi tube promotes the penetration of the chlorine bactericide into organisms so that its effect is improved. It is therefore possible to destroy bacteria and plankton having strong resistance to the chlorine bactericide. Also, the amounts of the chlorine bactericide to be added can be further reduced than in the case of using the chlorine bactericide singly.

In this case, a method may be adopted in witch only the activated carbon treatment apparatus 16 is used without supplying the chlorine reducing agent, residual chlorine in the sea water is reduced by activated carbon to suppress the generation of trihalomethanes and trihalomethanes produced in the holding tank 14 are adsorbed by activated carbon to remove these trihalomethanes. The time required to treat the sea water in the activated carbon treatment apparatus 16 is set in the range of 0.5 to 20 min. depending on the amount of the chlorine bactericide to be supplied to the sea water such that residual chlorine is sufficiently reduced and decomposed and produced trihalomethanes are adsorbed to remove these trihalomethanes. The time required for the activated carbon treatment to reduce residual chlorine and to adsorb trihalomethanes differs depending on the amount of the chlorine bactericide to be supplied to the sea water. However, if the amount of the chlorine bacteria is within its practical range, it is possible to reduce residual chlorine for a treatment time range of 0.5 to 20 min. to suppress the generation of trihalomethanes and to make activated carbon adsorb trihalomethanes to remove them. If the treatment time is shorter than 0.5 min., trihalomethanes cannot be sufficiently adsorbed. If the treatment time is longer than 20 min. on the other hand, the activated carbon treatment apparatus is increased in its scale, posing a space problem when it is mounted on a vessel and the problem that the time required to inject ballast water in the ballast tank is longer.

In the above embodiment, it is so devised that the chlorine bactericide is diffused by the venturi tube 7A and then, the chlorine reducing agent is diffused by the venturi tube 7B. However, a static mixer or a stirrer that rotates a stirring blade which produces a stirring flow in the sea water passage may be used as the diffuser in place of the venturi tube.

Also, the holding tank 14 and the activated carbon treatment apparatus 16 may be provided by remodeling a part of the ballast tank 9. If a part of the ballast tank 9 is used as the holding tank 14 and the activated carbon treatment apparatus 16, it is unnecessary to install the holding tank 14 and the activated carbon treatment apparatus 16 newly. This makes it easy to apply this structure to existing marine vessels and possible to decrease installation costs.

In the above example, there is an assumption that the treatment using a chlorine bactericide is carried out when sea water is taken into the ballast tank. However, the treatment may be carried out either when sea water is taken on by a vessel or when sea water is discharged or at both times. The timing at which the treatment using the chlorine bactericide is carried out may be determined according to the amount of microorganisms living in the sea area concerned and the navigation condition of a marine vessel. The treatment using a chlorine bactericide may be carried out not when sea water is taken into the ballast tank 9 but when sea water is discharged from the ballast tank 9.

Untreated sea water is fed to the ballast tank 9 through the (untreated) sea water feed line 11 when sea water is taken on. When this ballast water is discharged from the ballast tank 9, the pump 3 is operated to supply ballast water (untreated) kept in the ballast tank 9 to the filter 4 through the ballast water supply line 12 and thereafter treated in the same manner as above. The treated ballast water is discharged into the sea through the treated water discharge line 13.

Also, the treatment using the chlorine bactericide may be carried out both when sea water is taken into the ballast tank and when sea water is discharged from the ballast tank. In this case, the treatment may be lightly carried out when the ballast water is discharged.

Using the apparatus for treating ballast water according to the second embodiment, an experiment for destroying bacteria and plankton in sea water was made. Sodium hypochlorite was supplied as a chlorine bactericide to sea water such that the amount of available chlorine was 20 mg/L. The sea water was retained in a holding tank for 0.5 min., and then, 60 mg/L of hydrogen peroxide was supplied to the sea water. In the raw sea water before treated, $1.7 \times 10^5$ zooplankters/m$^3$ 50 μm or larger in size and $1.2 \times 10^5$ cfu/100 mL of colibacillus were living. After the above treatment, the number of zooplankters was decreased to 4/m$^3$ and the amount of colibacillus was decreased to less than 1 cfu/100 ml which was a detection limit and thus, the result that meets the IMO ballast water standard was obtained. Also, the concentration of trihalomethanes was as significantly low as about 0.002 mg/L in the sea water at the exit of the holding tank and kept in a concentration as significantly low as 0.002 mg/L even in the sea water 5 hours after hydrogen peroxide was supplied, to confirm that there was no problem concerning the influence of the ballast water on the environment.

Also, the concentration of residual hydrogen peroxide was 34 mg/L five days after hydrogen peroxide was supplied and therefore, hydrogen peroxide remained in a sufficient concentration, to confirm that the regrowth of plankton is suppressed. When 120 mg/L of sodium bisulfite was supplied to the sea water after 5 days, the concentration of hydrogen peroxide was decreased to 0.1 mg/L or less which was lower than detection limit, to confirm that hydrogen peroxide was decomposed.

EXPLANATION OF REFERENCE NUMERALS

1 Sea water intake line
2 Coarse filter
3 Pump
4 Filter
5, 5A (Chlorine) bactericide supply apparatus
6 Bactericide-decomposer supply apparatus
6A Hydrogen peroxide-decomposer supply apparatus
6B Chlorine reducing agent supply apparatus
7, 7A, 7B Venturi tube
8 Treated water discharge line
9 Ballast tank
10 Treated water discharge line
11 Untreated sea water feed line
12 Ballast water supply line
13 Treated water discharge line
14 Holding tank
15 Hydrogen peroxide supply apparatus
16 Activated carbon treatment apparatus

The invention claimed is:

1. An apparatus for treating ballast water, comprising:
a first pump that takes on sea water;
a filter apparatus having a filter that filtrates the sea water sent from the first pump and traps plankton with sizes corresponding to a sieve opening of the filter, the sieve opening being in the range of 10 to 200 μm;
the filter apparatus also having a reverse washing device that washes away plankton trapped by the filter;
a bactericide supply apparatus having a plurality of injection ports for supplying bactericide to the filtrate sea water;
a bactericide supply amount-control device that controls an amount of bactericide to be supplied from the bactericide supply apparatus,
a venturi tube apparatus that is located downstream of the filter apparatus and is constructed by arranging a plurality of venturi tubes in parallel, the plurality of injection ports being arranged in each of a radial direction and a circumferential direction within a cross-section of an inlet of the venturi tube apparatus;
a ballast tank that holds the sea water fed from the venturi tube apparatus;
a second pump that discharges the sea water from the ballast tank into the sea; and
a bactericide-decomposer supply apparatus that supplies bactericide-decomposer to the sea water discharged from the ballast tank so as to decompose the bactericide remaining in the sea water;
wherein the amount of the sea water sent from the first pump to the venturi tube apparatus is controlled such that a flow velocity at the inlet of the venturi tube apparatus is in the range of 2 to 3 m/sec, and a flow velocity at each throat part of the venturi tubes is in the range of 10 to 40 m/sec, the ratio of the sum of sectional areas of the throat parts of the venturi tubes to a sectional area at the inlet of the venturi tube apparatus being in the range of 7.5 to 20%,
the venturi tube apparatus generates cavitation in the sea water at the throat parts of the venturi tubes, thus diffusing the bactericide in the sea water to sterilize bacteria, and also destroying plankton or damaging plankton so as to promote penetration of the bactericide into a body of plankton,
the amount of bactericide to be supplied is controlled to be sufficient to sterilize bacteria and plankton in the filtrate sea water and also to prevent regrowth of bacteria and plankton in the sea water kept in the ballast tank, and
the amount of bactericide-decomposer to be supplied is controlled based on a measurement of bactericide concentration in the sea water discharged from the ballast tank.

2. The apparatus for treating ballast water according to claim 1,
wherein the bactericide supply amount-control device measures a pressure difference across the filter apparatus and controls the amount of the bactericide to be supplied from the bactericide supply apparatus based on the measured value,
the bactericide supply amount-control device increasing the amount of the bactericide when the pressure difference is larger than a predetermined value, and decreasing the amount of the bactericide when the pressure difference is smaller than the predetermined value.

3. The apparatus for treating ballast water according to claim 1,
further comprising a water quality measuring device that measures turbidity or absorbance of the sea water to be introduced into the filter or the sea water filtered by the filter; wherein
the bactericide supply amount-control device controls the amount of the bactericide to be supplied from the bactericide supply apparatus based on the turbidity or absorbance measured by the water quality measuring device,
the bactericide supply amount-control device increasing the amount of the bactericide when the turbidity or absorbance measured by the water quality measuring device is larger than a predetermined value, and decreasing the amount of the bactericide when the turbidity or absorbance measured by the water quality measuring device is smaller than the predetermined value.

4. The apparatus for treating ballast water according to claim 1,
wherein the bactericide is sodium hypochlorite,
the apparatus further comprising a redox potential measuring device that measures a redox potential of the sea water to which the bactericide is added, and wherein
the bactericide supply amount-control device controls the amount of the bactericide to be supplied from the bactericide supply apparatus based on the redox potential measured by the redox potential measuring device, the bactericide supply amount-control device adjusting the amount of the bactericide such that the redox potential is 800 mV or higher with respect to a silver/silver chloride electrode.

5. A method for treating ballast water, comprising:
a filtering step of filtering sea water when sea water is taken on, a filter having a sieve opening in the range of 10 to 200 μm and thereby trapping plankton having sizes corresponding to the sieve opening;
a bactericide supply step, subsequent to the filtering step, of supplying bactericide to the filtrate sea water from a bactericide supply apparatus having a plurality of injection ports;
a cavitation treatment step, subsequent to the bactericide supply step, of introducing the sea water to which the bactericide has been added, into a venturi tube apparatus to generate cavitation in the sea water, the venturi tube apparatus being constructed by arranging a plurality of venturi tubes in parallel, the plurality of injection ports being arranged in each of a radial direction and circumferential direction within a cross section of an inlet of the venturi tube apparatus;

a water holding step of holding the sea water which has been subjected to the cavitation treatment, into a ballast tank;

a bactericide-decomposer supply step of supplying bactericide-decomposer to the sea water discharged from the ballast tank so as to decompose the bactericide remaining in the sea water;

wherein an amount of the sea water fed to the venturi tube apparatus is controlled such that a flow velocity at an inlet of the venturi tube apparatus is in the range of 2 to 3 m/sec, and a flow velocity at each throat part of the venturi tubes is in the range of 10 to 40m/sec, during the cavitation treatment step, cavitation in the sea water is generated at the throat parts of the venturi tubes, thus diffusing the bactericide in the sea water to sterilize bacteria, and also destroying plankton or damaging plankton so as to promote penetration of the bactericide into a body of plankton, an amount of bactericide to be supplied is controlled to be sufficient to sterilize bacteria and plankton in the filtrate sea water and also to prevent regrowth of bacteria and plankton in the sea water kept in the ballast tank, and an amount of bactericide-decomposer to be supplied is controlled based on measurement of bactericide concentration in the sea water discharged from the ballast tank.

6. The method for treating ballast water according to claim 5, wherein the amount of the sea water fed to the venturi tube apparatus is set such that the head pressure loss across the venturi tube apparatus is 5 to 40 m.

7. The method for treating ballast water according to claim 5, wherein the bactericide is sodium hypochlorite, and the amount of the bactericide to be supplied is adjusted such that a concentration by weight of available chlorine in the sea water is 1 to 100 mg/L.

8. The method for treating ballast water according to claim 5, wherein the bactericide is sodium hypochlorite, and the amount of the bactericide to be supplied is adjusted such that a redox potential of the sea water to which the bactericide is added is 800 mV or higher with respect to a silver/silver chloride electrode.

* * * * *